(12) United States Patent
Takagi et al.

(10) Patent No.: US 6,272,148 B1
(45) Date of Patent: Aug. 7, 2001

(54) SCHEME FOR RELIABLE COMMUNICATIONS VIA RADIO AND WIRE NETWORKS USING TRANSPORT LAYER CONNECTION

(75) Inventors: Masahiro Takagi, Tokyo; Eiji Kamagata; Noriyasu Kato, both of Kanagawa, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/158,095

(22) Filed: Sep. 22, 1998

(30) Foreign Application Priority Data

Sep. 22, 1997 (JP) .................................................. 9-257153
Sep. 29, 1997 (JP) .................................................. 9-264422
Aug. 20, 1998 (JP) .................................................. 10-249072

(51) Int. Cl.⁷ ...................................................... H04J 3/16
(52) U.S. Cl. ............................................................ 370/469
(58) Field of Search ................................. 370/338, 469, 370/315, 331, 356, 355, 401, 436, 439; 455/507, 426

(56) References Cited

U.S. PATENT DOCUMENTS

| 5,828,666 | * | 10/1998 | Focsaneanu et al. | 370/389 |
| 5,912,878 | * | 6/1999 | Park et al. | 370/229 |
| 6,003,084 | * | 12/1999 | Green et al. | 709/227 |
| 6,091,733 | * | 7/2000 | Takagi et al. | 370/401 |

FOREIGN PATENT DOCUMENTS 0 766 427  4/1997 (EP) .
WO 97/08838  3/1997 (WO) .
WO 97/13380  4/1997 (WO) .

OTHER PUBLICATIONS

A. V. Bakre, et al., IEEE Transactions on Computers, vol. 46, No. 3, pp. 260–278, "Implementation and Performance Evaluation of Indirect TCP", Mar. 1, 1997.

A. Bakre, et al., Proceedings of the International Conference on Distributed Computing Systems, vol. Conf. 15, pp. 136–143, "I–TCP: Indirect TCP for Mobile Hosts", May 30, 1995.

* cited by examiner

Primary Examiner—Wellington Chin
Assistant Examiner—Brenda H. Pham
(74) Attorney, Agent, or Firm—Oblon, Spivak, McClelland, Maier & Neustadt, P.C.

(57) ABSTRACT

A highly reliable gateway device for improving the performance of communications utilizing the transport layer connection provided via a radio network, by setting up the transport layer connection between a wire terminal and a radio terminal in a form suitable for an application, or by enabling a control of the transport layer connection according to the radio communication state between the radio terminal and a base station, without changing implementation of the transport layer of a terminal connected to a wire network, is disclosed. The gateway device determines whether or not to carry out a set up of a connection in divided forms according to an information content of a packet that contains a transport layer protocol data unit requesting a set up of the transport layer connection between the radio terminal of the radio network and the wire terminal of the wire network.

18 Claims, 27 Drawing Sheets

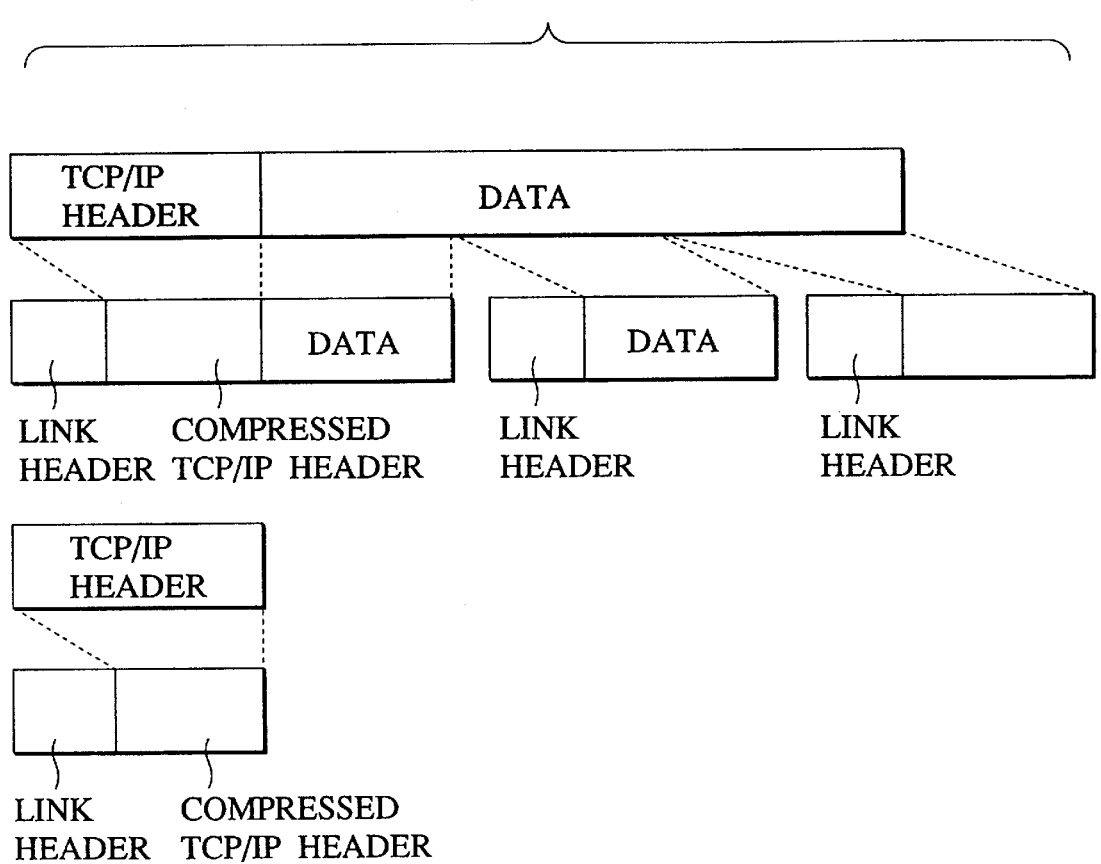

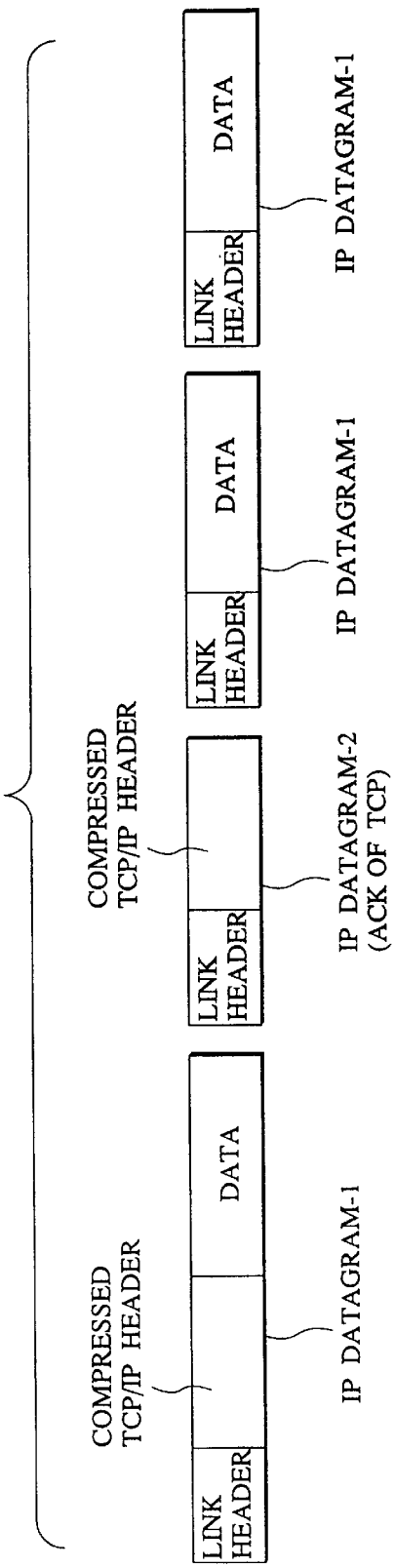

FIG.7

| SOURCE IP ADDRESS | DESTINATION IP ADDRESS | FLOW ID | RELAY METHOD |
|---|---|---|---|
| a. b. c. d | h. i. j. k | l | IP |
| h. i. j. k | a. b. c. e | m | TCP |
| ⋮ | ⋮ | ⋮ | ⋮ |
| a. b. f. g | h. i. j. m | n | APPLI-CATION |

FIG.10

| MAC ADDRESS | IP ADDRESS |
|:---:|:---:|
| x | a. b. c. d |
| ⋮ | ⋮ |
| y | h. i. j. k |

| IP HEADER | TRANSFER REQUEST FLAG | TRANSFER TARGET ADDRESS | RADIO TERMINAL ADDRESS |

| TRANSFER TARGET ADDRESS | RADIO TERMINAL ADDRESS | INTERFACE | TIMER NO. |
|---|---|---|---|
| ×××× | ○○○○ | △△ | □□ |

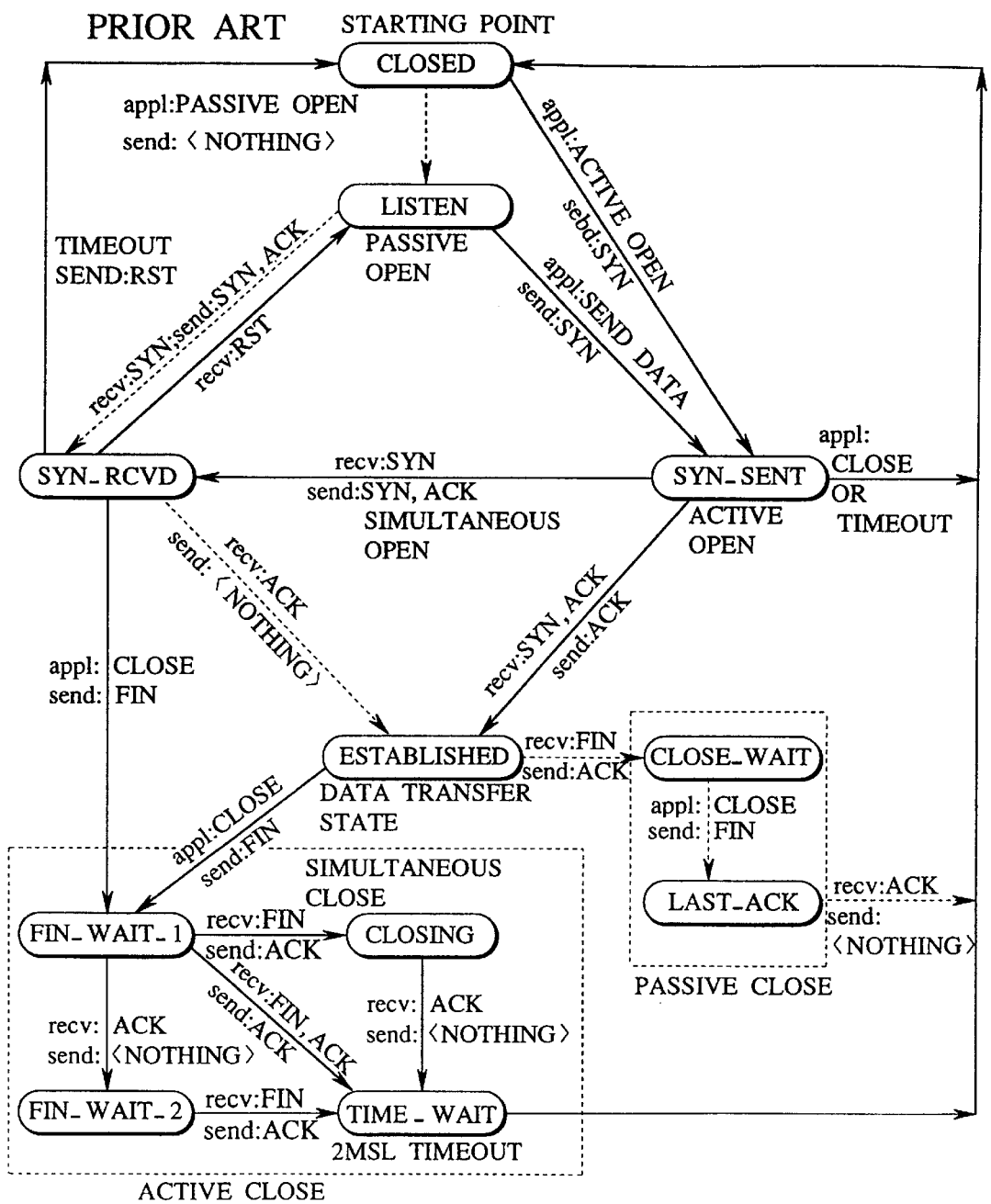

SCHEME FOR RELIABLE COMMUNICATIONS VIA RADIO AND WIRE NETWORKS USING TRANSPORT LAYER CONNECTION

BACKGROUND OF THE INVENTION

1. Field of the Invention

The present invention relates to a gateway device, a radio terminal device and a router device which are communication devices for realizing communication protocol containing the transport layer, and a method for controlling a gateway in a communication network.

2. Description of the Background Art

In recent years there are increasing demands for realizing data communications by radio. TCP (Transmission Control Protocol) is widely used as a reliable transport layer protocol in the wire data communications, but the direct application of this protocol to radio communications causes the following problems.

A TCP segment loss in the wire communications implies the congestion of a network so that TCP is designed to avoid the congestion by lowering a data transmission rate when the segment loss is detected. For this reason, the TCP segment loss due to a radio section error and a handoff will also be interpreted as the congestion so that the congestion avoidance operations will be executed more than necessary and as a result the throughput will be lowered more than necessary.

More specifically, when a terminal is carrying out communications, there are cases where packet transmission and reception are stopped due to degradation of a quality of radio transmission path in the network, for example. In such a case, TCP attempts the re-transmission several times using time-out of a re-transmission timer, while setting a congestion window to 1×MSS (Maximum Segment Size). This implies that it takes some time before the original transmission rate is fully recovered even when the packet transmission and reception become possible again.

Also, many data communication services utilizing network have a higher likelihood of being used for downloading data from a server terminal to a client terminal, so that there is a recently developed access network using asymmetric transmission rates in which a bandwidth for input to a client terminal is considerably wider than a bandwidth for an output from a client terminal. When such an asymmetric configuration is applied to the radio communications, it is possible to omit mounting a wide bandwidth radio transmitter on a client terminal so that there is an advantage that a client terminal can be formed in a compact size. However, in such a network having asymmetric transmission paths, there are cases where the throughput of the TCP from a server to a client is lowered because the recommended TCP implementation calls for an algorithm which returns one "ack" (acknowledgement) with respect to at least two TCP segments. This is because the throughput from a server to a client cannot exceed a value given by [(bandwidth in client→server direction)×(2×maximum segment size)/ack size].

In order to resolve these problems, there is a proposition to use the usual TCP in a wire network and the radio transport layer in a radio network and relay communications at a border between the wire network and the radio network. This is a scheme in which "selective ack" is used for a high TCP segment loss rate, the congestion problem is handled in such a way that a re-transmission is carried out by not regarding a data loss in the radio section as the congestion, and the asymmetry problem is handled in such a way that the maximum segment size of the TCP in the radio section is made larger.

However, the method in which the transport layer connection is relayed by terminating it once at a gateway is in violation to the end-to-end semantics of the TCP which requires to guarantee that data of interest has reached a receiving side terminal when "ack", i.e., acknowledgement, for that data is received by a transmitting side terminal. This is because the gateway for carrying out the TCP relay at a border of a wire section and a radio section returns "ack" for data to the transmitting side when that data is received at the gateway.

Application layer protocols utilizing TCP include those which require the preservation of the end-to-end semantics and those which do not. In HTTP (HyperText Transfer Protocol), the client sets up a TCP connection prior to a individual HTTP request, and the server disconnects a TCP connection after a response to the HTTP request is transmitted from the client. In this case, the request is completed by a response by the application layer so that no problem arises even when the end-to-end sematics of the TCP are changed. However, it is preferable to preserve the end-to-end semantics of the TCP for protocols such as TELNET (remote terminal protocol).

Also, when it becomes necessary to relay a TCP connection at different gateways as a radio terminal carries out handoff, there is a need to give information regarding states of transport layers in the wire section and the radio section to a new gateway from a gateway that has been relaying the TCP connection for that radio terminal up to now, so as to establish a state capable of relaying the TCP connection for that radio terminal at the new gateway. But as this transfer and establishing of a state takes some time, there has also been a problem that the throughput is lowered when the radio terminal carries out handoff between base stations that are accommodated in different gateways.

In addition, a radio service area in which the gateway can provide the TCP connection relay service should preferably be wider from a viewpoint that the number of handoffs between gateways for carrying out the TCP connection relay can be reduced that way, but when a wide radio service area is served by a single gateway, there arises a problem that the concentration of loads due to the Increased number of radio terminals to be served by that gateway can cause a bottleneck in performance.

Moreover, in the case where not only "ack" of the TCP with respect to data transmitted through a transmission path on a wider bandwidth side but also other data are to be transmitted by multiplexing them in a transmission path on a narrower bandwidth side in the asymmetric communication paths, there appears a phenomenon in which mean and variance of RTT (Round Trip Time) increase. In this case, a bandwidth delay product increases so that the throughput will be lowered unless a receiving window size is enlarged accordingly. However, the receiving window size cannot be enlarged to a sufficient size corresponding to the bandwidth delay product on the wide bandwidth side. Also the transmitting side of the TCP determines RTO (Retransmission Time Out) according to the observed RTT, but as RTO becomes large, the re-transmission wait time at a time of TCP segment loss also increases so that the throughput is lowered.

Also, consider a case where the gateway operation stops after the gateway transmits "ack" for some data with respect to the transmitting side terminal and before the transmission of that data to the receiving side terminal succeed. In this case, the transmitting side terminal discards that data from a re-transmission buffer upon receiving "ack" so that it becomes impossible to retransmit that data. Namely, the TCP connection is a transport layer protocol that is aimed at realizing reliable communications but the introduction of gateway has a contrary effect of lowering the reliability of the TCP.

Also, in the TCP layer and the IP (Internet Protocol) layer, it is possible to utilize standard additional functions that are provided as options. Here, the options include a search of MTU (Maximum Transfer Unit) which is the maximum packet size that can be transferred without fragmentation on a path between communicating terminals, for example. When this procedure is carried out, it becomes possible to transfer data in the maximum packet length that can be transmitted on the path in which the TCP connection is set up and it also becomes possible to avoid spending wasteful processing time because no fragments are produced at intermediate routers and the like on the path. For this reason, there is an advantage that the throughput can be improved in the TCP connection. This procedure is called a path MTU discovery.

An information for controlling such options is attached behind the TCP and IP header as shown in FIG. 29. A terminal A that wishes to utilize the option transmits a TCP segment having a header with this option attached thereto at a time of requesting the TCP connection establishing. Upon receiving this TCP segment having a header with the option attached thereto, a terminal B carries out a prescribed option processing and determines whether to permit or refuse that option. Then, the terminal B transmits a TCP segment that contains an information on permission/refusal. When this information indicates the permission, the optional function will be executed, whereas when this information indicates the refusal, the optional function will not be executed.

As such, there is a need to determine whether or not to permit the option eventually between terminals that set up the connection, but in the case of relaying the connection at a gateway, the connection is set up in division upon receiving the TCP connection establishing request at the gateway, so that there is a problem that the above described exchange cannot be carried out between the terminals that set up the connection.

Also, in TCP, the management of a series of processings in the sequence of: connection establishing→data transmission and reception→connection disconnection, is realized by using a TCP state transition diagram shown in FIG. 30. In FIG. 30, the transmission and reception of actual user data are carried out in the "ESTABLISHED" state. A "CLOSED" state corresponds to a period since the connection release until the connection establishing, where no connection exists. SYN_SENT, SYN_RCVD and LISTEN are connection establishing phases, and the others are connection release phases. In TCP, many states exist as such, and there is a problem that, in the case of carrying out an operation to shift the gateway function from one gateway that is currently carrying out or trying to carry out the TCP connection relay to another gateway, for example, there is a possible for falling into unstable state at a time of shifting that function depending on the state of the original gateway.

SUMMARY OF THE INVENTION

It is therefore an object of the present invention to provide a highly reliable gateway device for improving the performance of communications utilizing the transport layer connection provided via a radio network, by setting up the transport layer connection between a wire terminal and a radio terminal in a form suitable for an application, or by enabling a control of the transport layer connection according to the radio communication state between the radio terminal and a base station, without changing implementation of the transport layer of a terminal connected to a wire network, so as to resolve the above described problems that arise when a reliable transport layer protocol is applied to a radio network.

It is another object of the present invention to provide a radio terminal device, a router device and a method for controlling a gateway in a communication network, which are capable of improving the performance of communications utilizing the transport layer connection similarly.

According to one aspect of the present invention there is provided a gateway device for relay connecting a radio network and a wire network, comprising: a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a control unit for controlling the connection set up unit by determining whether or not to carry out a connection set up by the connection set up unit according to an information content of a packet that contains a transport layer protocol data unit requesting a set up of the transport layer connection between the radio terminal of the radio network and the wire terminal of the wire network.

According to another aspect of the present invention there is provided a gateway device for relay connecting a radio network and a wire network, comprising: a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a transmission unit for receiving a request for setting up the first connection or the second connection along with a control option information, converting the control option information, and transmitting a request for setting up the second connection or the first connection along with a converted control option information, regardless of whether the control option information is valid or invalid in the first connection or the second connection.

According to another aspect of the present invention there is provided a gateway device in a communication network in which a plurality of gateway devices connected to respectively different radio networks are interconnected through a wire network, the gateway device comprising: a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a control unit for shifting a gateway function to another gateway device if the first connection and the second connection are in established states and disconnecting the first connection and the second connection if one of the first connection and the second connection is not in an established state, when one radio terminal moves from a radio service area covered by a base station of one radio network accommodated in said gateway device to another radio service area covered by another base station of another radio network accommodated in said another gateway device.

According to another aspect of the present invention there is provided a gateway control method in a communication network in which a plurality of gateway devices connected to respectively different radio networks are inter-connected through a wire network, where each gateway device has a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network, the method comprising the steps of: controlling a second gateway device from a first gateway device when one radio terminal moves from a radio service area covered by a first base station of one radio network accommodated in the first gateway device to another radio service area covered by a second base station of another radio network accommodated in the second gateway device, such that the second gateway device starts transmission via the second base station to said one radio terminal of transport layer protocol data units that are not yet transmitted, before the first gateway device receives all acknowledgements for transport layer protocol data units already transmitted to said one radio terminal via the first base station; and shifting a gateway function with respect to said one radio terminal from the first gateway device to the second gateway device.

According to another aspect of the present invention there is provided a gateway control method in a communication network in which a plurality of gateway devices connected to respectively different radio networks are inter-connected through a wire network, where each gateway device has a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network, the method comprising the steps of: controlling a first gateway device when a moving of one radio terminal from a radio service area covered by a first base station of one radio network accommodated in the first gateway device to another radio service area covered by a second base station of another radio network accommodated in a second gateway device is predicted, so as to start transfer of an information regarding the transport layer protocol at the first gateway device to the second gateway device; and shifting a gateway function with respect to said one radio terminal from the first gateway device to the second gateway device.

According to another aspect of the present invention there is provided a gateway control method in a communication network in which a plurality of gateway devices connected to respectively different radio networks are inter-connected through a wire network, where each gateway device has a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network, the method comprising the steps of: controlling a first gateway device when a moving of one radio terminal from a radio service area covered by a first base station of one radio network accommodated in the first gateway device to another radio service area covered by a second base station of another radio network accommodated in a second gateway device is predicted, so as to start transfer to the second gateway device of data which are already transmitted to said one radio terminal by the transport layer protocol but for which acknowledgements from said one radio terminal are not yet received at the first gateway device; controlling the first gateway device when the moving of said one radio terminal is completed, so as to start transfer of an information regarding the transport layer protocol at the first gateway device to the second gateway device; and shifting a gateway function with respect to said one radio terminal from the first gateway device to the second gateway device.

According to another aspect of the present invention there is provided a radio terminal device for carrying out communications with a radio terminal of a radio network or a wire terminal of a wire network through base stations, the radio terminal device comprising: a connection set up unit for carrying out set up and disconnection of a transport layer connection; and a handoff notification unit for notifying start and end of an handoff operation between base stations to the connection set up unit upon detecting the start and the end of the handoff operation between base stations; wherein the connection set up unit disconnects the transport layer connection if a state of the transport layer connection is in a set up in progress state when the start of the handoff operation is notified, and starts setting up the transport layer connection again when the end of the handoff operation is notified.

According to another aspect of the present invention there is provided a gateway device for relay connecting a radio network and a wire network, comprising: a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a transmission unit for transmitting a transport layer protocol data unit containing a signal for suppressing packet transmission to a correspondent terminal of one radio terminal, when a handoff start signal indicating that said one radio terminal starts operation for handoff from a radio service area covered by a first base station to a radio service area covered by a second base station.

According to another aspect of the present invention there is provided a gateway device for relay connecting a radio network and a wire network, comprising: a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a control unit for controlling transmission of transport layer protocol data units when one radio terminal moves from a radio service area covered by a first base station to another radio service area covered by a second base station, such that transmission via the second base station to said one radio terminal of transport layer protocol data units that are not yet transmitted is started before receiving all acknowledgements for transport layer protocol data units already transmitted to said one radio terminal via the first base station.

According to another aspect of the present invention there is provided a gateway device for relay connecting a radio network and a wire network, comprising: a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a transmission unit for transmitting a signal for requesting another gateway device to transfer packets upon receiving the packets from one radio terminal, when a signal indicating that said one radio terminal has moved out from a radio service area covered by a first base station of one radio network accommodated in said gateway device is received from the first base station, said another gateway device accommodating a second base station adjacent to the first base station or another radio network to which the second base station is connected.

According to another aspect of the present invention there is provided a radio terminal device for carrying out communications with a radio terminal of a radio network or a wire terminal of a wire network through base stations, the radio terminal device comprising: a transport layer protocol processing unit for carrying out a transport layer protocol processing; a transmission suppression unit for transmitting a signal for suppressing packet transmission to the transport layer protocol processing unit; and a handoff notification unit for notifying start and end of an handoff operation between base stations to the transmission suppression unit upon detecting the start and the end of the handoff operation between base stations, such that the transmission suppression unit starts transmission of said signal for suppressing packet transmission when the start of the handoff operation is notified and ends transmission of said signal for suppressing packet transmission when the end of the handoff operation is notified.

According to another aspect of the present invention there is provided a radio terminal device to be connected with a gateway device having a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network, and a control unit for determining whether or not to carry out a connection set up by the connection set up unit, the radio terminal device comprising: a selection unit for selecting either a first request for requesting the connection set up unit to set up the transport layer connection in divided forms or a second request for requesting the connection set up unit to set up the transport layer connection in undivided forms; and a transmission unit for transmitting the first request or the second request selected by the selection unit to the gateway device.

According to another aspect of the present invention there is provided a radio terminal device, comprising: a segmentation unit for segmenting a network layer protocol data unit into a plurality of datalink layer protocol data units; a transmission unit for transmitting the datalink layer protocol data units segmented by the segmentation unit; and a control unit for evaluating priority levels of a first network layer protocol data unit and a second network layer protocol data unit when the second network layer protocol data unit to be transmitted arises before transmission of all the datalink layer protocol data units segmented from the first network layer protocol data unit is finished, and controlling the transmission unit such that transmission of the datalink layer protocol data unit segmented from the second network layer protocol data unit prior to transmission of the datalink layer protocol data unit segmented from the first network layer protocol data unit when the second network layer protocol data unit has a higher priority level than the first network layer protocol data unit.

According to another aspect of the present invention there is provided a router device, comprising: a connection unit for connecting the router device with a plurality of gateway devices either directly or via network, each gateway device having a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a route set up unit for making a routing setting such that either network layer protocol data units transmitted by one radio terminal or network layer protocol data unit destined to said one radio terminal will be routed to a specific one of said plurality of gateway devices, at a time of starting service with respect to said one radio terminal.

According to another aspect of the present invention there is provided a router device, comprising: a connection unit for connecting the router device with a plurality of gateway devices either directly or via network, each gateway device having a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; a correspondence setting unit for setting the radio terminals and the gateway devices in correspondence; and a routing unit for routing either network layer protocol data units transmitted by one radio terminal or network layer protocol data units destined to said one radio terminal, to one gateway device which is set in correspondence to said one radio terminal by the correspondence setting unit.

According to another aspect of the present invention there is provided a gateway control method in a communication network having two gateway devices capable of relaying transport layer connection between a first terminal and a second terminal, and carrying out a relay of the transport layer connection by selectively using one of the two gateway devices, the method comprising the steps of: multicasting transport layer protocol data units transmitted from the first terminal by the transport layer connection, to each of the two gateway devices; multicasting transport layer protocol data units transmitted from a first gateway device among the two gateway devices that is currently playing a role of relaying the transport layer connection, to the first terminal and a second gateway device among the two gateway devices that is currently playing a role of standby, as a response to the first terminal with respect to transport layer protocol data units received from the first terminal, or to the second terminal and the second gateway device, as a relay to the second terminal; judging presence or absence of a trouble occurrence in the first gateway device according to at least a state of transport layer protocol data unit reception from the first terminal and the first gateway device, at the second gateway device; and switching roles of the first gateway device and the second gateway device when the judging step judges that a trouble occurred in the first gateway device.

Other features and advantages of the present invention will become apparent from the following description taken in conjunction with the accompanying drawings.

BRIEF DESCRIPTION OF THE DRAWINGS

FIG. 4 is a diagram showing a manner of segmenting an IP datagram into a plurality of datalink frames according to one embodiment of the present invention.

FIG. 5 is a diagram showing a state where a pure TCP "ack" is present among a plurality of datalink frames constituting an IP datagram according to one embodiment of the present invention.

FIG. 6 is a diagram showing one exemplary form of a relay method table used by a gateway device according to one embodiment of the present invention.

FIG. 7 is a diagram showing another exemplary form of a relay method table used by a gateway device according to one embodiment of the present invention.

FIG. 10 is a diagram showing a radio terminal address registration table used by a base station device according to one embodiment of the present invention.

FIG. 30 is a TCP state transition diagram according to the conventional art.

DETAILED DESCRIPTION OF THE PREFERRED EMBODIMENTS

Referring now to FIG. 1 to FIG. 28, the various embodiments of the present invention will be described in detail.

Figure 1:
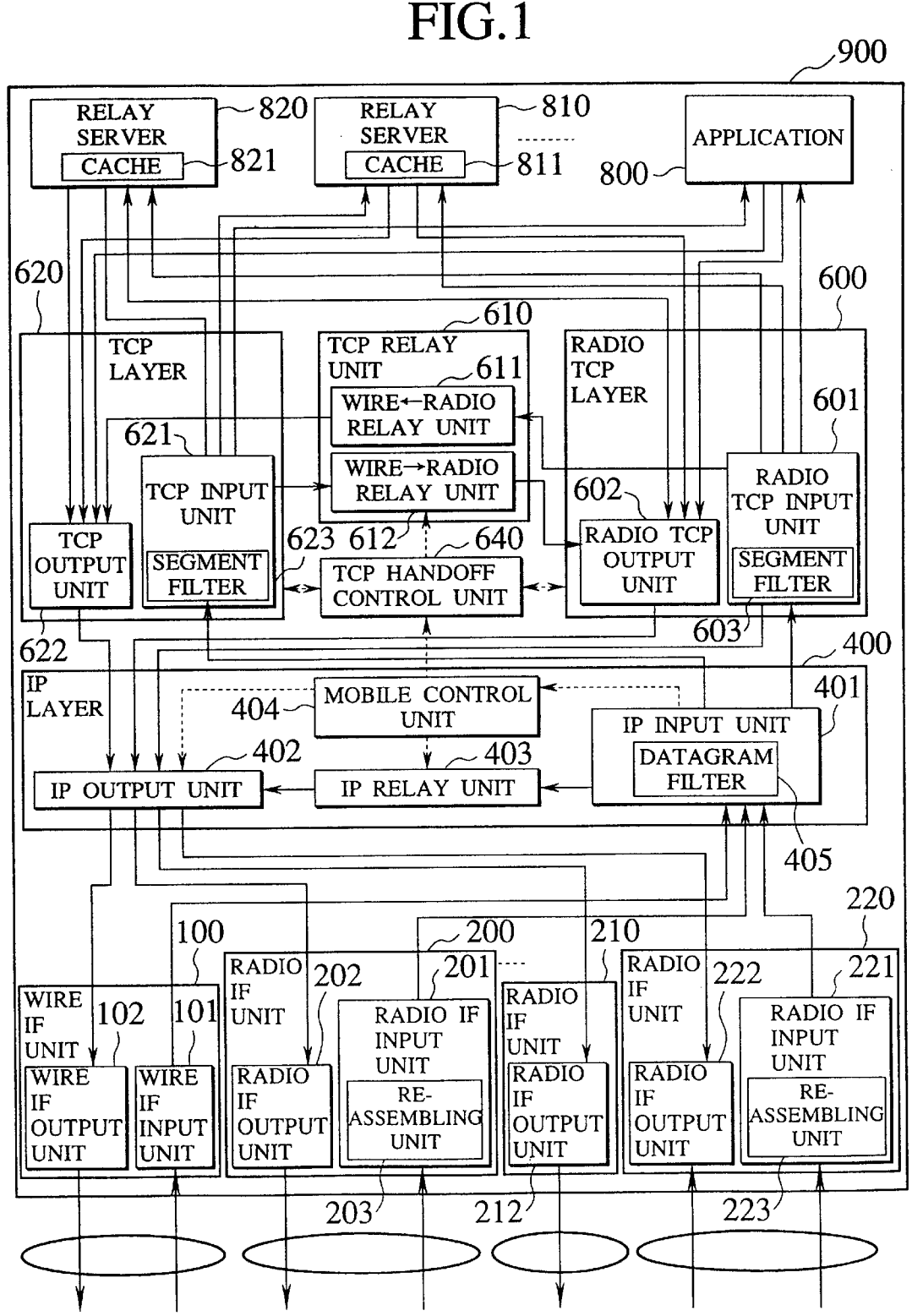
FIG. 1 is a block diagram showing a configuration of a gateway device according to one embodiment of the present invention.

FIG. 1 shows an exemplary configuration of a gateway device 900 in one embodiment of the present invention, where solid lines among blocks indicate data flows while dashed lines among blocks indicate control flows.

This gateway device 900 of FIG. 1 comprises an application 800, relay servers 810 and 820 having caches 811 and 821 respectively, a radio TCP layer 600, a TCP relay unit 610 having a radio to wire relay unit 611 and a wire to radio relay unit 612, a TCP layer 620, an IP layer 400, a wire IF (interface) unit 100, and a plurality of radio IF units 200, 210 and 220.

The radio TCP layer 600 contains a radio TCP input unit 601 having a segment filter 603 and a radio TCP output unit 602. The TCP layer 620 contains a TCP input unit 621 having a segment filter 623 and a TCP output unit 622. The IP layer 400 contains an IP input unit 401 having a datagram filter 405, an IP relay unit 403, an IP output unit 402, and a mobile control unit 404. The wire IF unit 100 contains a wire IF input unit 101 and a wire IF output unit 102. The radio IF unit 200 contains a radio IF input unit 201 and a radio IF output unit 202. The radio IF unit 210 contains a radio IF output unit 212. The radio IF unit 220 contains a radio IF input unit 221 and a radio IF output unit 222.

Here, the transport layer protocol that is modified for radio use will be referred to as "radio TCP". For example, it can be TCP with such modifications that "selective ack" is carried out in order to deal with a high error rate at a time of radio communications and a congestion window control is always set to be "slow start" in order not to regard a TCP segment loss as the congestion. It can also be TCP with such modifications that, in the case where the uplink and downlink bandwidths are asymmetric, the maximum segment size is set larger in order to reduce the number of occurrences of "ack" in the radio section and the threshold for a fast re-transmission algorithm is set smaller in order to reduce the number of re-transmissions due to time-out.

Note that the present invention carries out the control by utilizing information across protocol layers so that a border between protocol layer blocks are not strictly defined one. In other words, it is possible to consider a configuration where functions belonging to one protocol layer in this embodiment are implemented in another protocol layer.

Figure 2:
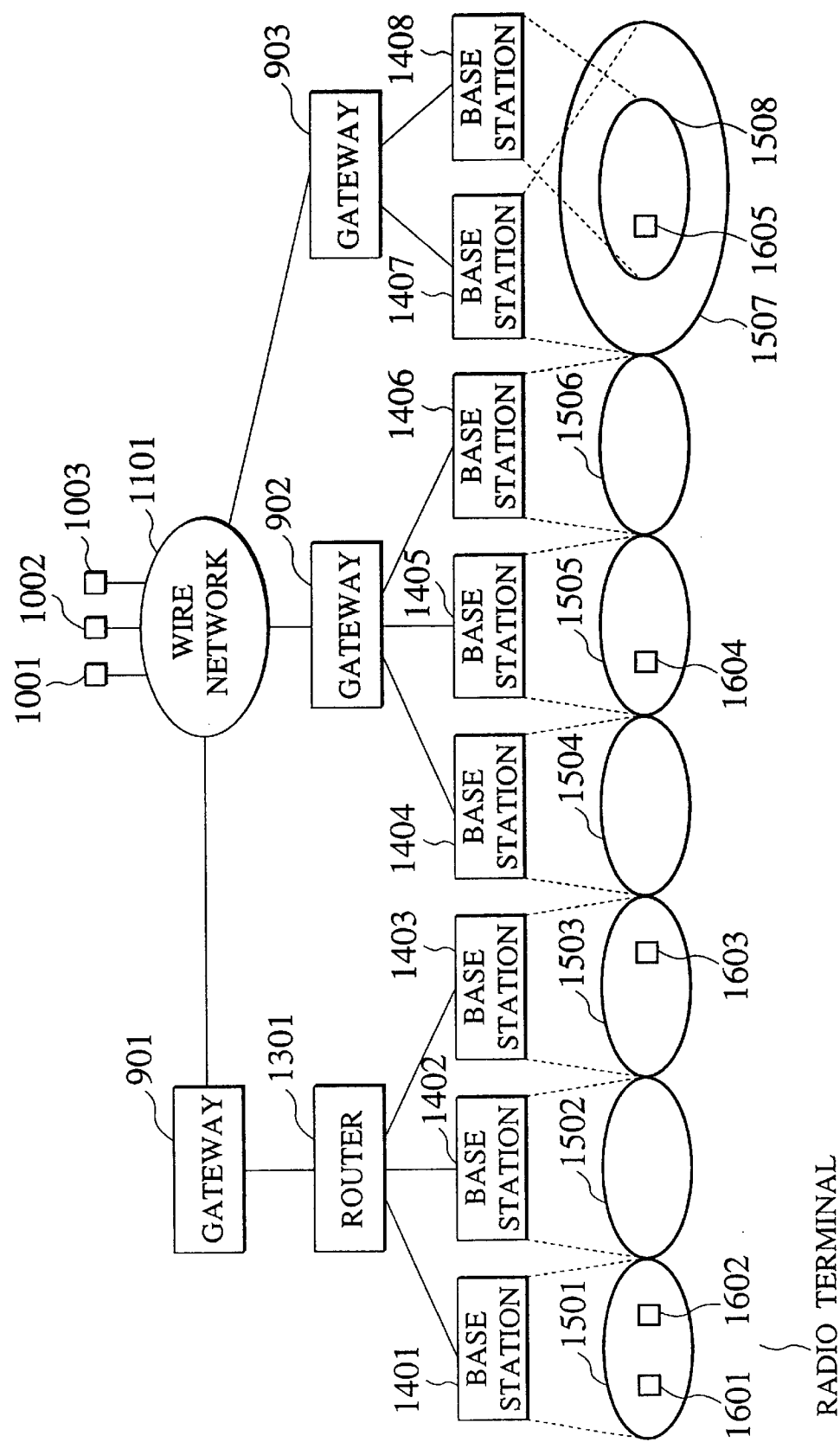
FIG. 2 is a schematic diagram showing a configuration of a communication network which constitutes the first embodiment of the present invention.

FIG. 2 shows an exemplary configuration of a first communication network using the gateway device 900 of FIG. 1 which constitutes the first embodiment of the present invention. This communication network of FIG. 2 comprises wire terminals 1001, 1002 and 1003 which are connected to a wire network 1101, a gateway device 901 which is connected to a wire network 1101 and also indirectly connected with base stations 1401, 1402 and 1403 through a router 1301, a gateway device 902 which is connected to the wire network 1101 and also directly connected with base stations 1404, 1405 and 1406, a gateway device 903 which is connected to the wire network 1101 and also directly connected with base stations 1407 and 1408, and radio terminals 1601 to 1605 which carry out communications while moving among radio service areas 1501 to 1508 that are respectively covered by the base stations 1401 to 1408.

Note that the router 1301 can be an ordinary router that carries out the routing by referring to the header information of the IP datagram, or an exchanger for exchanging virtual channels through which IP datagrams are to pass, which usually does not refer to the header of the IP datagram in the device (which may refer to the header of the IP datagram only at a time of virtual channel set up in order to determine a router for a channel, for example).

The configuration of the gateway device 900 shown in FIG. 1 is a generic one, and not necessarily showing a specific configuration for the gateway devices 901, 902 and 903 of the network shown in FIG. 2. However, for the sake of explanation, it is assumed that the gateway device has a property of having the wire IF unit 100 connected to the wire network 1101 and the radio IF unit 200 connected to the base stations 1401 to 1406. Also, in the network of FIG. 2, it is assumed that a unidirectional radio IF unit 210 is connected to the base station 1408 and operating as a set with the radio IF unit 220 that is connected to the base station 1407, so as to realize communications with asymmetric transmission rates where the transmission from the base station 1408 to the radio terminal 1605 is fast while the transmission and reception between the radio terminal 1605 and the base station 1407 are relatively slow.

Figure 3:
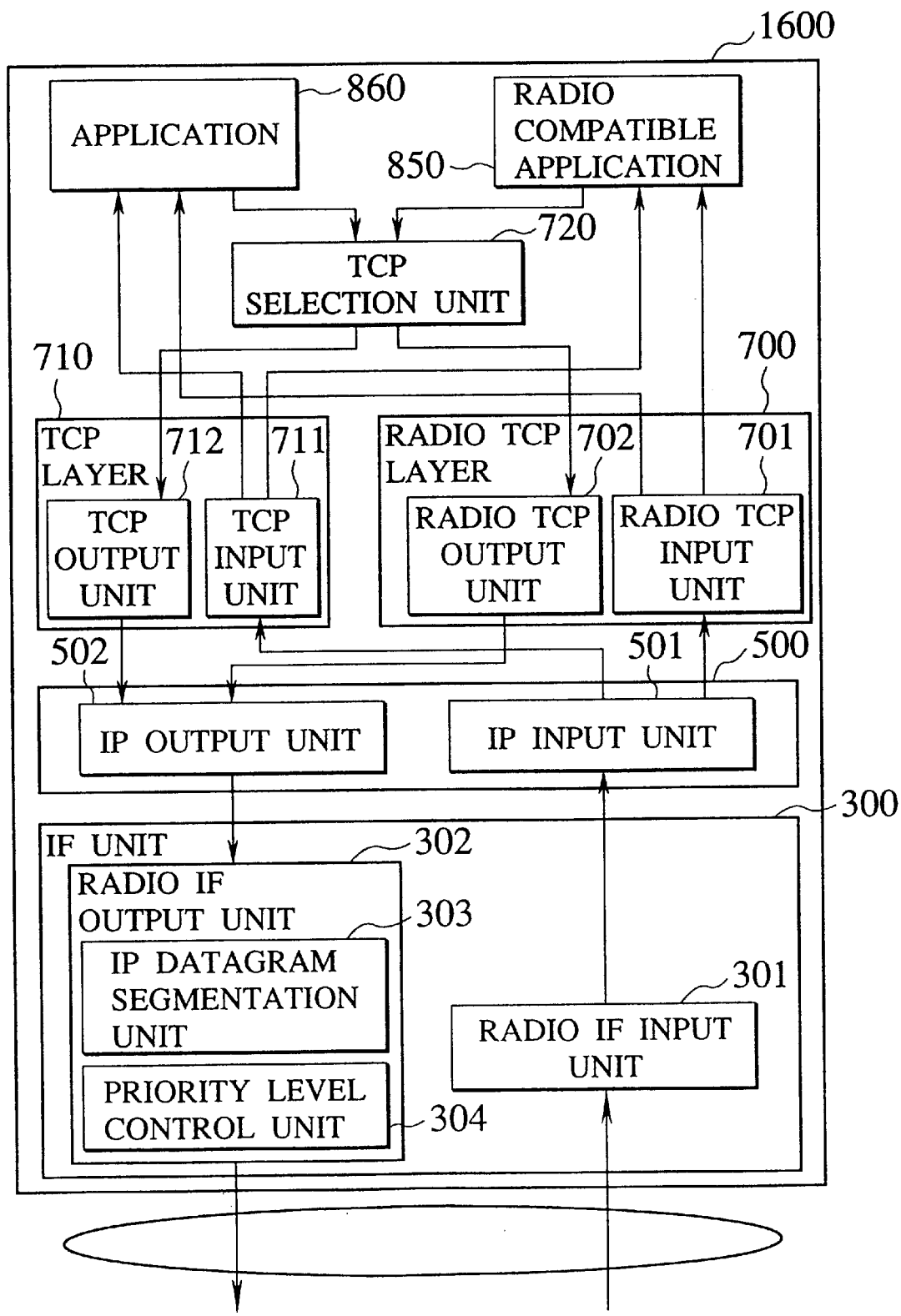
FIG. 3 is a block diagram showing a configuration of a radio terminal device according to one embodiment of the present invention.

FIG. 3 shows an exemplary configuration of a radio terminal 1600 in one embodiment of the present invention. This radio terminal 1600 of FIG. 3 comprises a radio compatible application 850, an application 860, a radio TCP layer 700 containing a radio TCP input unit 701 and a radio TCP output unit 702, a TCP layer 710 containing a TCP input unit 711 and a TCP output unit 712, a TCP selection unit 720, an IP layer 500 containing an IP input unit 501 and an IP output unit 502, and a radio IF unit 300.

The wire IF unit 100 and the radio IF units 200, 210 and 220 of the gateway device 900 are realizing the so called datalink layer functions, but they also carry out operations partly based on information of the TCP layer and the IP layer. Among these operations, those particularly worth mentioning here are the following.

The radio IF input units 201 and 221 have IP datagram reassembling units 203 and 223 respectively for reassembling an original IP datagram from a received IP datagram that is given in a form of being divided into a plurality of datalink frames.

FIG. 4 shows a manner by which the IP datagram is to be divided into a plurality of datalink frames. The IP datagram reassembling unit 203, 223 carries out the processing for reassembling the original IP datagram (reassembling) even in the case (shown in FIG. 5) where a plurality of datalink frames that constitute the other IP datagram are present among a plurality of datalink frames that constitute one IP datagram. This IP datagram reassembling is carried out under the condition that a plurality of datalink frames that constitute one IP datagram are transmitted without changing the order among them, and an identifier of the IP datagram is described in the header of each datalink frame, for example.

The IP datagram reassembling unit 203, 223 checks a size of that IP datagram according to an IP header contained in the first datalink frame, recognizes all the datalink frames that constitute the IP datagram according to this size and the identifier, and reassembles the IP datagram by assembling them. Also, the IP datagram reassembling unit 203, 223 discards these datalink frames when a prescribed condition such as time-out is satisfied before all the datalink frames that constitute the same IP datagram are completely received.

In the examples shown in FIG. 4 and FIG. 5, a case where a pure "ack" of the TCP ("ack" comprising a header alone without data) is present among a plurality of datalink frames that constitute the IP datagram. In particular, in the case where a first information is transmitted by TCP through a high speed radio link, "ack" for that is returned through a low speed radio link, and a second information is transmitted through a low speed radio link, it is possible to expect some improvement in the performance of the TCP due to reduced size and variance of RTT of the TCP, by shortening the datalink frames for transmitting the second information and allowing the presence of "ack" among them. Also, the datalink frames here are largely different from the IP fragments in that they do not have any IP header except for the first one. As it is sufficient to guarantee the uniqueness for a short period of time, the identifier can be made sufficiently shorter compared with the IP header, so that this method has a smaller overhead than the case of using IP fragments. Obviously, this method also has a smaller overhead than the case of reducing size and variance of RTT of the TCP by reducing a TCP segment size.

Also, the IP datagram reassembling unit 203, 223 has a function for converting a TCP/IP header in a compressed format into a TCP/IP header in a normal format, and gives the IP datagram to the IP input unit. Here, a method of compression can be that used in SLIP (Serial Line IP) or PPP (Point-to-Point Protocol) or its variants. In particular, in the radio communications using asymmetric transmission rates, it is effective to use such a compression for a transmission path with a narrow bandwidth (small transmission rate), so that there is an effect of the throughput improvement even in a configuration where such a compression is not used for a transmission path with wide bandwidth.

The IP layer 400 of the gateway device 900 is different from the usual IP layer on the following points.

In the usual IP layer, the IP input unit 401 raises the IP datagram destined to the own system to the upper layer (TCP layer), and gives the others to the IP relay unit 403. However, the datagram filter 405 of the IP input unit 401 according to the present invention gives even an IP datagram that has a destination different from the IP address allocated to the own system, to the radio TCP input unit 601 if it is entered from the radio IF unit 200, 220, or to the TCP input unit 621 if it is entered from the wire IF unit 100, provided that the following conditions (1) and (2) are satisfied. At a time of giving it, a tag for specifying one of a connection set up, a relay in the TCP layer, and a relay in the application layer is attached to the IP datagram.

(1) It is an IP datagram regarding a set up of a new TCP connection (which will be referred to as "connection set up IP datagram" in the following). More specifically, it is an IP datagram that contains any one of a SYN segment from a requesting side (usually client), a SYN segment containing "ack" of the server side corresponding to that, and "ack" from the client side corresponding to that, which are necessary in setting up a TCP connection. It is also possible to consider a configuration in which the IP datagram entered from the radio IF unit 200 is not to be included in this category. This is significant in the case where the radio terminal explicitly requests the TCP relay by specifying the IP address of the gateway device.

(2) It is an IP datagram (in which a protocol field indicates TCP) that flows through an existing TCP connection, which is predetermined to be relayed at the TCP layer or the above at a time of TCP connection set up (which will be referred to as "upper layer relay IP datagram" in the following). More specifically, it is an IP datagram for which a set of [source IP address, source port number, destination IP address, destination port number] that is to be used in identifying the TCP connection is registered in a relay method table to be described below, as an entry for the TCP layer relay or the application layer relay, or an IP datagram for which a set of [source IP address, destination IP address, flow ID] is registered in the relay method table to be described below, as an entry for the TCP layer relay or the application layer relay.

Note that it is also possible to use a configuration where IP datagrams to be relayed from wire to wire or from radio to radio are not to be included among those which are to be raised to the upper layer such as TCP layer, by referring to the destination IP address, the source IP address, or the flow ID. This is effective, for example, in the case where the improvement of the performance can be realized by making a change in accordance with the radio transmission path characteristics only in a radio TCP layer that is provided at each radio terminal, because only transmission through a radio section is used in the case of transmission between radio terminals.

The mobile control unit 404 contained in the IP layer 400 changes the routing information of the IP relay unit 403 so as to reflect the moving of the radio terminal 1601–1605, and carries out the control such that the entered IP datagram will be outputted to a proper IF corresponding to the destination radio terminal 1601–1605.

Also, the mobile control unit 404 notifies to the TCP and upper layers that the radio terminal 1601–1605 has a possibility of moving to a service area of the other gateway device, when the moving of the radio terminal is from a radio service area that is not physically adjacent to the radio service area of the base station accommodated in the other gateway device to a radio service area that is physically adjacent to the radio service area of the base station accommodated in the other gateway device, among the radio service areas of the base stations accommodated in this gateway device, or when the power of the radio terminal is turned on at the radio service area that is physically adjacent to the radio service area of the base station accommodated in the other gateway device, at a timing of an appropriate event (such as that the receiving power becomes smaller than a threshold) after the moving. The usual handoff is carried out at the network layer or the below, but the present invention has states in and above the transport layer, so that there are cases where it is effective to provide the handoff at the transport layer or the above. This notification will be utilized in order to notify the timing for starting the handoff preparation at the transport layer or the above.

The TCP layer (containing 600, 610 and 620) of the gateway device 900 is different from the usual TCP layer on the following points.

The usual TCP layer has only the TCP segment destined to the own system entered and gives data contained therein to an appropriate application according a port number. However, the TCP layer according to the present invention carries out the processing of the TCP segment contained in the connection set up IP datagram and the upper layer relay IP datagram in addition to that.

The radio TCP layer 600 realizes the transport layer protocol that is modified for radio use as described above. When the connection set up IP datagram is received by the radio TCP input unit 601 or the TCP input unit 621, the segment filter 603 or 623 determines whether the relay by the IP relay unit 403 is to be carried out, the relay by the TCP relay unit 610 is to be carried out, or the relay by the application relay server 810, 820 is to be carried out, according to the content of the header of the TCP segment, and the content of the payload in some cases. In many cases, the upper layer application can be specified by the source and destination port numbers contained in the TCP header. When it cannot be specified, it is possible to guess the application from an information in the TCP payload. Whether the relay at the IP layer is to be carried out, the relay at the TCP layer is to be carried out, or the relay at the application layer is to be carried out will be decided according to a type of application that is handled by the TCP connection to be set up. In the following, an exemplary policy that can be used in this determination will be described.

The significance of carrying out the relay at the TCP layer lies in that the TCP throughput between terminals can be improved without changing the TCP layer of the wire terminal and the radio TCP layer of the radio terminal, by changing the TCP layer 620 or the radio TCP layer 600 of the gateway device 900 to a protocol suitable for a transmission path in the wire network 1101 or the radio network. In addition, by setting up the TCP connection between radio terminals in forms of two connections to be used in the radio network, or by setting up the TCP connection between the radio terminal and the wire terminal in forms of a connection to be used in the radio network and a connection to be used in the wire network, the RTT in one connection can be reduced such that the re-transmission at a time of TCP segment loss will be carried out quickly, and therefore the throughput improvement can be expected in this respect as well.

However, by carrying out the relay at the TCP layer as described above, the end-to-end semantics of the TCP will not be preserved so that when the operation of the gateway device 900 stops during communications using the relay at the TCP layer it is possible to cause an inconsistency where the transmitting terminal recognizes that data has reached to the correspondent terminal even though data has actually not reached to the correspondent terminal. Also, when all the connections are to be relayed at the TCP layer, it is possible to have cases where the actual performance improvement cannot be achieved as the load on the gateway device 900 becomes exceedingly high.

Also, the significance of carrying out the relay at the application layer lies in that the relay can be carried out by accounting for the semantics of data to be transferred. For example, if the caching of data is made at a time of relaying, the relay operation can be omitted in the case of receiving another request for relaying the same data again by reading out the data from the cache 811, 821 and transmitting the read out data.

Also, in the case where the level of details is expressed hierarchically for a given data and data in a plurality of hierarchical levels ranging from outline data with a small data amount to detailed data with a large data amount are stored in the server, all the data in all the hierarchical levels can be transferred from the server up to the gateway device and then data of a suitably selected hierarchical level can be transmitted at a time of data transfer to the user terminal according to a state of a transmission path between the gateway device and the user terminal. Also, it becomes possible to provide more sophisticated services with respect to the terminal by carrying out the relay and transfer while also carrying out arbitrary operation with respect to data, as in the case of relaying while applying the data source compression coding method conversion or relaying while applying the encryption or decryption, As an exemplary policy for determination as to whether the relaying at the TCP layer is to be carried out or the relaying at the application layer is to be carried out, the following may be used.

The relaying at the IP layer is carried out when it is an application for which it is desirable not to change the end-to-end sematics of the TCP (when "ack" is received, it implies that the transmission data is received by the correspondent host), such as telnet.

The relaying at the TCP layer is carried out when it is an application for which there is no need to preserve the end-to-end semantics of the TCP and there is no corresponding application relay server at the gateway, such as smtp.

The relaying at the application layer is carried out when it is an application for which there is no need to preserve the end-to-end semantics of the TCP and there is a corresponding application relay server at the gateway, such as ftp or http.

As another exemplary policy for determination, the following may be used.

The relaying at the TCP layer is carried out when it is an application for carrying out bursty data transfer that requires higher throughput of the TCP, such as ftp or http.

The relaying at the IP layer is carried out when it is an interactive application that does not require higher throughput of the TCP, such as telnet.

The policy for determination as to whether or not to carry out the relaying at the TCP layer can be specified by the application in advance, or set up at appropriate timing according to the system configuration or the state of load on the gateway device.

After determining the relay method, the set of four elements including source IP address, source port number, destination IP address and destination port number for the purpose of identifying the TCP connection and the determined relay method are stored in correspondence in the relay method table as shown in FIG. 6, for example. Note that the TCP connection is bidirectional so that the naming of source and destination can be a matter of convenience, and if there is no entry in the relay method table at a time of search using source and destination as specified in the information contained in the IP datagram, it suffices to carry out the search by reversing source and destination as specified in the information contained in the IP datagram. It is also possible to use the set of three elements including source IP address, destination IP address and flow ID instead and store it along with the determined relay method in correspondence in the relay method table as shown in FIG. 7.

In the case of carrying out the relay at the TCP layer or the above, the same set of four elements is going to be allocated as the identification information to two TCP connections (in the above described case of using source IP address, source port number, destination IP address and destination port number as the identification information), but these two TCP connections can be distinguished by using an information that can be ascertained from the context of the processing, such as whether the IP datagram to be processed is an input to the gateway device or an output from the gateway device, and whether source and destination are remaining as specified or reversed. Note that, in the case of carrying out the relay at the TCP layer or the above, it is possible to distinguish two TCP connections by using different sets of four elements, but in such a case it is preferable to configure the table accordingly and carry out the search accordingly.

In the case of carrying out the relay at the IP layer, the entered IP datagram is given to the IP output unit 402 as it is. In the case of carrying out the relay at the TCP layer or the above, the gateway device 900 sets up the originally requested TCP connection in divided forms of a radio TCP connection and a TCP connection. When the first SYN segment for the purpose of setting up the TCP connection is received, the gateway device 900 returns the SYN segment containing "ack" with respect to that first SYN segment to the source terminal, and upon receiving "ack" with respect to this SYN segment, the gateway device 900 sets up the first TCP (or radio TCP) connection. On the other hand, in order to set up a second radio TCP (or TCP) connection between the gateway device 900 and the requested destination terminal, the gateway device 900 transmits a new SYN segment. The set up of the second radio TCP (or TCP) connection is completed through the reception of SYN segment containing "ack" with respect to the new SYN segment and the transmission of "ack" with respect to that SYN segment. Note that, in the case of the relay at the application layer, the second radio TCP (or TCP) connection is set up by the request of the relay server 810, 820, so that there can be cases where the second radio TCP (or TCP) connection is not set up when the request of the application can be satisfied by reading out the information already stored in the cache 811, 812.

The relay at the application layer carried out by the gateway device of the present invention differs from the conventionally used proxy in that, when the radio terminal requests the connection set up, connecting of two TCP connections and relaying at the application layer are made by the intermediate gateway device without requiring an explicit specification of proxy, so that the radio terminal can operate without being conscious of this gateway operation.

Upon receiving the upper layer relay IP datagram (or the TCP segment contained therein), the radio TCP input unit 601 gives it to the TCP output unit 622 through the radio to wire relay unit 611 of the TCP relay unit 610 if the tag attached at the IP input unit indicates the relay at the TCP layer. Similarly, upon receiving the upper layer relay IP datagram, the TCP input unit 621 gives it to the radio TCP output unit 602 through the wire to radio relay unit 612 if the tag attached at the IP input unit indicates the relay at the TCP layer. If the tag indicates the relay at the application layer, the IP datagram is given to the application corresponding to the port number of the TCP.

Note that the exemplary case of relay connection between a radio TCP connection and a TCP connection at the gateway device has been described above, but the relay connection can be realized by the similarly procedure also in the case of relay connection between a radio TCP connection and a radio TCP connection in communications between radio terminals, or the case of relay connection between a TCP connection and a TCP connection in communications between wire terminals, except for differences in the TCP layer and the IF unit that are to be used.

The TCP layer carries out the handoff of the TCP layer in the case where the radio terminal 1601–1605 moves between radio service areas of the gateway devices 901–903 (a sum of the radio service areas of the base stations accommodated in each gateway device). When the state of all TCP (and radio TCP) connections that are relayed for that radio terminal is re-established at a new gateway device, the handoff of the TCP layer is completed. Here, the state of connections includes:

The set of four elements regarding address and port for identifying each connection;

Already received data in the first (second) radio TCP (TCP) connection that are not acknowledged in the second (first) TCP (radio TCP) connection; and A receiving window, a congestion window, acknowledged sequence numbers and transmitted sequence numbers for each TCP connection.

As already mentioned above, the mobile control unit 404 can notify the TCP handoff control unit 640 of the TCP layer about a situation where the above described handoff between the gateway devices is likely to occur, so that the time required for the handoff of the TCP layer can be shortened when the TCP handoff control unit 640 starts preparation at that timing. More specifically, for example, the preparation may include the following.

A TCP connection for transferring information on the TCP layer handoff is set up between the current gateway device and a gateway device that is conjectured to be a moving target.

Regions for holding transfer data (as much as the maximum window size) and management information of each TCP connection are reserved and initialized.

Data received in the first (second) radio TCP (TCP) connection are also transferred to a gateway device that is conjectured to be a moving target, and stored in the reserved transfer data region. If data overflows the reserved region, data is discarded in an order of smaller sequence number.

Then, when the handoff actually occurs, the state of the management information such as a receiving window, a congestion window, acknowledged sequence numbers, and transmitted sequence numbers is ascertained and the gateway function is shifted by transferring this information to a new gateway device, and when this is completed, the TCP relay by the new gateway device is started. Note that, if "tack" of the radio TCP has a cumulative property similar to the usual TCP, the state of the radio TCP will not become unstable and the throughput will not be lowered even when "ack" transmitted from the radio terminal to the old gateway device cannot be received at the new gateway device. Consequently, the transmission of not yet transmitted data from the new gateway device can be started before "ack" for all the data that were transmitted from the old gateway device. Using this method, it becomes possible to reduce the data transfer interruption time at a time of handoff, so that the improvement of the TCP throughput becomes possible.

Note that, even in the case where the radio terminal 1601–1604 makes the handoff between the base stations that are accommodated in the same gateway device, such as the base stations 1401–1403 or the base stations 1404–1406, using the above mentioned fact that "ack" of the TCP is cumulative, the radio TCP output unit 602 may start transmission of not yet transmitted data through a new base station before receiving "ack" for all data that were transmitted through an old base station, and this case also has effects that the state of the TCP will not become unstable and the throughput will not be lowered.

Next, a procedure by which the gateway device for carrying out the TCP relay operation for the radio terminal predicts a handoff across base stations as the radio terminal moves, and detects the completion of the handoff, will be described with references to FIG. 8 and FIG. 9.

Figure 8:
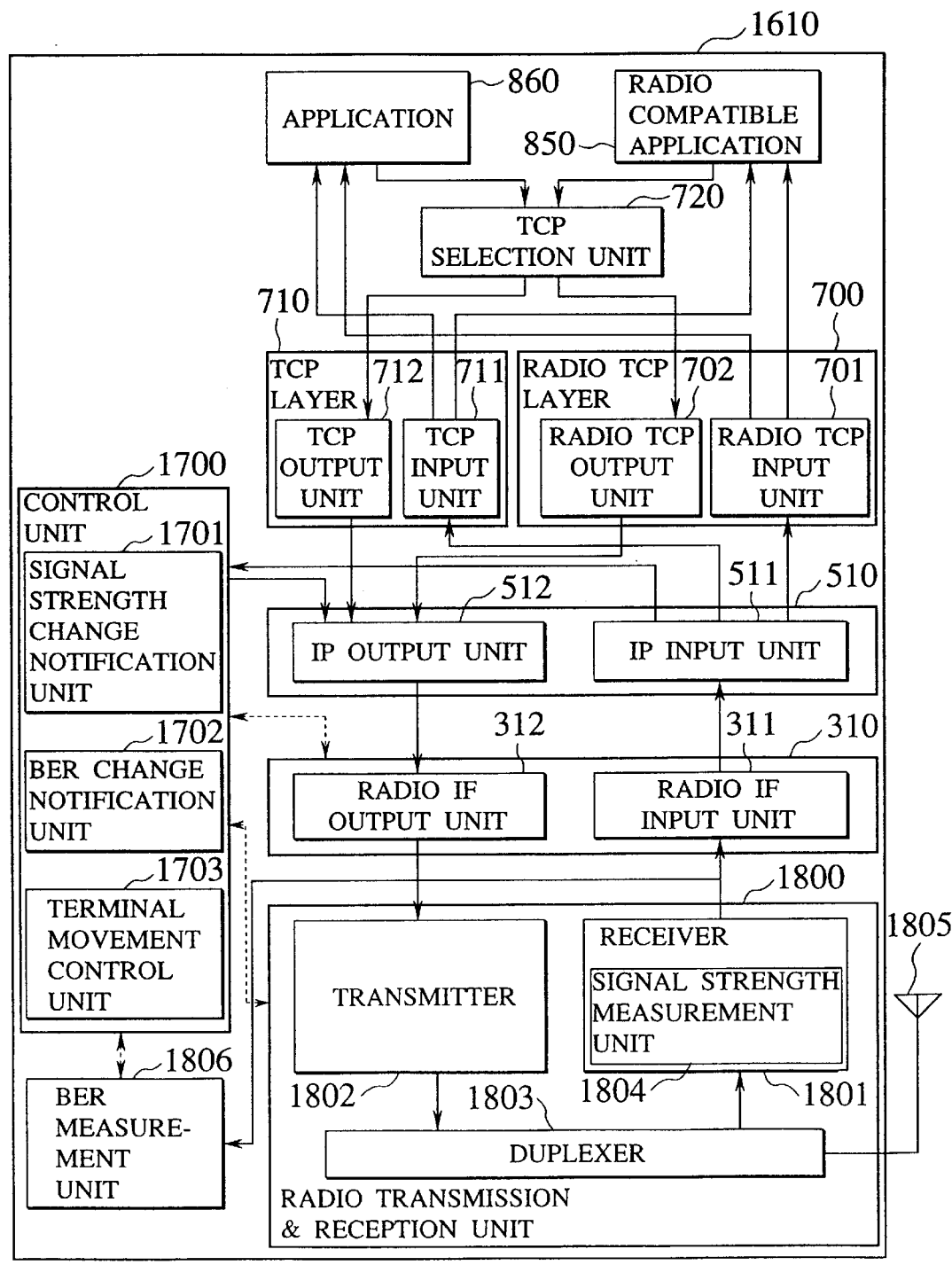
FIG. 8 is a block diagram showing a configuration of a radio terminal device according to one embodiment of the present invention.

In a radio terminal 1610 shown in FIG. 8, a signal strength measurement unit 1804 measures the received signal strength of radio waves transmitted from the base station either continuously or regularly, and notifies it regularly to a control unit 1700. A BER (Bit Error Rate) measurement unit 1806 measures a bit error rate in signals flowing from a receiver 1801 to a radio IF input unit 311 for a prescribed period of time, and notifies it regularly to the control unit 1700.

A signal strength change notification unit 1701 of the control unit 1700 gives a message to an IP output unit 512, where the message contains the received signal strength obtained by the signal strength measurement unit 1804 and the identifier of the own radio terminal, and has the gateway device as its destination. For the identifier, an IP address allocated to the radio terminal 1610 can be used, for example. Similarly, a BER change notification unit 1702 of the control unit 1700 gives a message to the IP output unit 512, where the message contains the BER obtained by the BER measurement unit 1806 and the identifier of the own radio terminal, and has the gateway device as its destination. The IP output unit 512 transmits such a message as an IP packet through a radio IF output unit 312 and a transmitter 1802.

When the radio terminal 1610 moves during the radio communications with the base station and comes near a boundary of the radio service area of that base station, the lowering of the received signal strength or the increase of the BER occurs in general. For this reason, when the gateway device receives a notification of the received signal strength or the BER that is transmitted from the radio terminal and detects the above described lowering of the received signal strength or increase of the BER by the mobile control unit 404, it is possible to judge that the mobile terminal has moved to near the boundary of the radio service area of the currently communicating base station and start preparation for the handoff.

Figure 9:
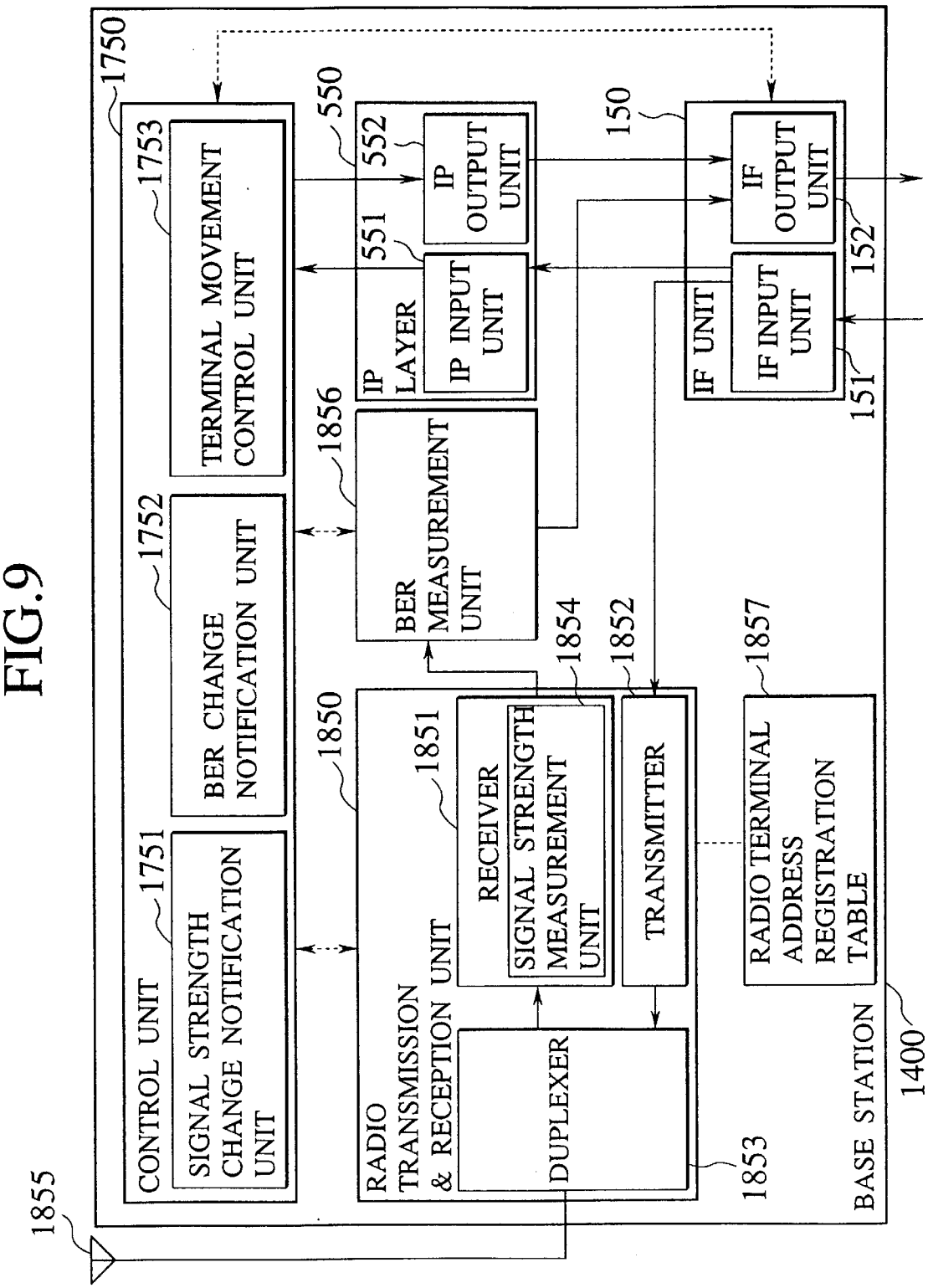
FIG. 9 is a block diagram showing a configuration of a base station device according to one embodiment of the present invention.

Similarly, in a base station 1400 shown in FIG. 9, it is also possible to measure the received signal strength of radio waves transmitted from the radio terminal at a signal strength measurement unit 1854 and to measure the BER of signals flowing from a receiver 1851 to an IF output unit 152 at a BER measurement unit 1856, so that by transmitting the measurement result at the base station before the handoff to the gateway device, it also becomes possible for the gateway device to predict the handoff of the radio terminal, and by transmitting the measurement result at the base station after the handoff to the gateway device, it also becomes possible for the gateway device to detect the completion of the handoff.

Apart from measuring the quality of a radio transmission path and the like in this manner, it is also possible to make the gateway device capable of predicting the handoff of the radio terminal or detecting the completion of the handoff, by detecting whether a radio transmission path between the radio terminal and the base station is established or not at a radio transmission and reception unit 1800 of the radio terminal 1610 or a radio transmission and reception unit 1850 of the base station 1400, and notifying this information to the gateway device.

More specifically, a radio transmission path between the radio transmission and reception unit 1800 of the radio terminal 1610 and the radio transmission and reception unit 1850 of the base station 1400 is assumed to have its establishing state and the like managed according to a physical address or a MAC address assigned to the radio transmission and reception unit or a radio IF unit 310 similarly as in the conventional radio communication system. In this case, when the radio transmission and reception unit 1850 of the base station 1400 detects that the radio transmission path between this base station and the radio terminal that has been TCP relayed by the gateway device has disconnected, for example, it refers to a radio terminal address registration table as shown in FIG. 10 for converting a physical address or a MAC address of that radio terminal into a radio terminal identifier (such as IP address) that can be recognized by the gateway device, and transmits a message that contains this identifier and has the gateway device as its destination through an IP output unit 552 and a wire IF output unit 152.

Upon receiving this message, the gateway device 900 can recognize that it is in a state where the data transfer cannot be carried out at a transmission path between the radio terminal and the base station that has been TCP relayed, and start an operation in preparation of the handoff between base stations or the shifting of the gateway function. Note that the radio terminal address registration table shown in FIG. 10 may be provided at the gateway device 900, in which case the gateway device can obtain the identifier (such as IP address) of the radio terminal by referring to the radio terminal address registration table when the base station 1400 notifies a physical address or a MAC address of the radio terminal to the gateway device.

Figure 10:
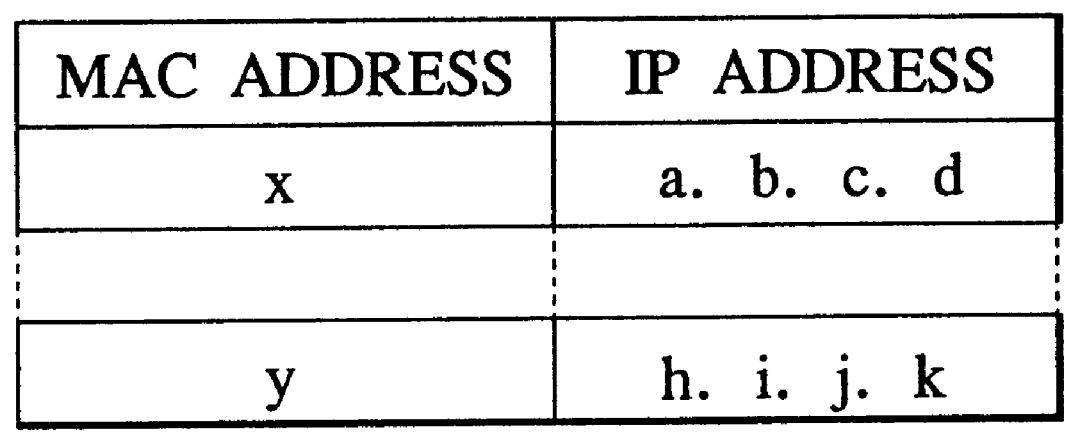

On the contrary, when the moving target base station detects that the radio terminal 1610 has established a radio transmission path with respect to that moving target base station, it refers to the radio terminal address registration table as shown in FIG. 10 for converting a physical address or a MAC address of that radio terminal into a radio terminal identifier (such as IP address) that can be recognized by the gateway device, and transmits a message that contains this identifier and has the gateway device as its destination through the IP output unit 552 and the wire IF output unit 152.

Upon receiving this message, the gateway device 900 can recognize that a transmission path between the radio terminal 1610 and the moving target base station has established, and start the data transfer again quickly. Note that the radio terminal address registration table shown in FIG. 10 may be provided at the gateway device 900, in which case the gateway device can obtain the identifier (such as IP address) of the radio terminal by referring to the radio terminal address registration table when the base station 1400 notifies a physical address or a MAC address of the radio terminal to the gateway device.

Next, a procedure by which the gateway device detects a moving of the radio terminal when the radio terminal moves between base stations accommodated in different gateway devices will be described.

Here, this procedure will be described for the exemplary case where the radio service areas of many base stations are formed by a plurality of subnets in a system in which an access is to be made to the Internet from the radio terminal through the base station and the gateway device, and Mobile-IP and DHCP (Dynamic Host Configuration Protocol) are utilized as techniques for enabling connection (transmission and reception of IP packets) to the Internet even when the radio terminal moves among these subnets. In these techniques, when the radio terminal moves to a different subnet, exchanges with functions provided at the network side are carried out.

Figure 11:
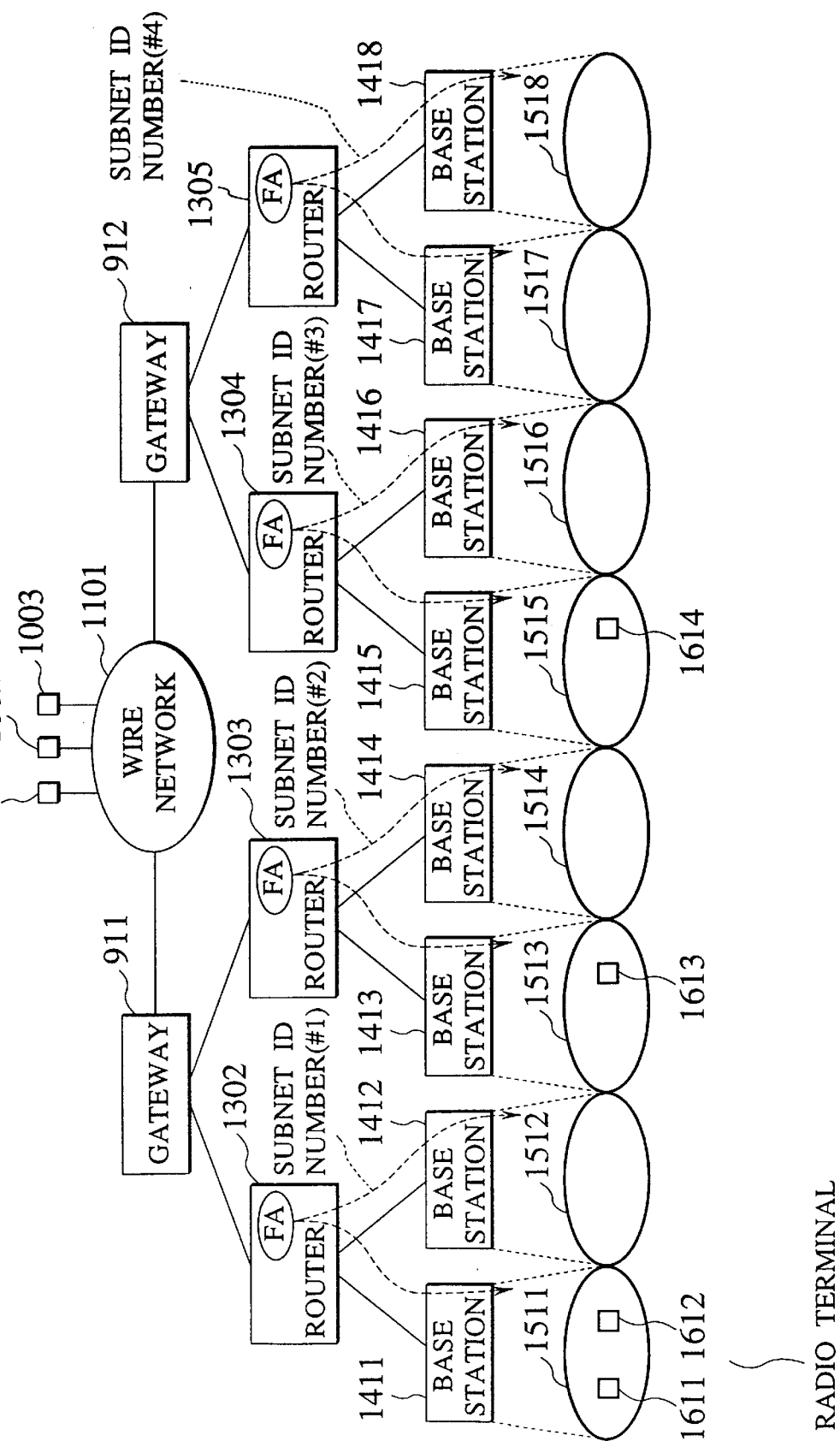
FIG. 11 is a schematic diagram showing a configuration of a communication network which constitutes the second embodiment of the present invention.

FIG. 11 shows an exemplary configuration of a second communication network which constitutes the second embodiment of the present invention. This communication network of FIG. 11 comprises wire terminals 1001, 1002 and 1003 which are connected to a wire network 1101, a gateway device 911 which is connected to the wire network 1101 and also indirectly connected with base stations 1411 and 1412 through a router 1302 as well as with base stations 1413 and 1414 through a router 1303, a gateway device 912 which is connected to the wire network 1101 and also indirectly connected with base stations 1415 and 1416 through a router device 1304 as well as with base stations 1417 and 1418 through a router device 1305, and radio terminals 1611 to 1614 which carry out communications while moving among radio service areas 1511 to 1518 that are respectively covered by the base stations 1411 to 1418. Here, the base stations 1411 and 1412, 1413 and 1414, 1415 and 1416, 1417 and 1418 which are connected to the same router are operated as the same subnet, and each one of the routers 1302 to 1305 is equipped with a function of FA (Foreign Agent) for providing various functions at a visited site subnet in Mobile-IP.

In Mobile-IP, an FA located in each subnet (a DHCP server located in each subnet in the case of DHCP) regularly broadcasts a subnet identifier or an address of FA (or DHCP server) that can identify the subnet, through base stations, as shown in FIG. 11. The radio terminal 1611–1614 can detect a moving to a subnet different from a previously located one by receiving this broadcast information regularly.

Then, in the case of using Mobile-IP, for example, the care-of address of packets destined to that radio terminal is notified from the FA while that radio terminal is located in that subnet, and a registration is requested to the FA so that packets destined to that radio terminal that are transmitted to the care-of address will be transferred to that radio terminal. Also, in DHCP, for example, a temporal IP address to be used in making access to the Internet from that radio terminal is acquired from the DHCP server which that radio terminal is located in that subnet. In addition to these series of exchanges, an identifier (such as IP address) of the gateway device that is accommodating that subnet is received from the FA or the DHCP server, and if it is different from the identifier of the gateway device that was carrying out the relay connection of the TCP connection previously, it is detected that there is a need for a shifting of the gateway function. At this point, the identifier of the gateway device for carrying out the relay connection of the TCP connection for a radio terminal that is located in that subnet is registered in the FA or the DHCP server.

When the radio terminal detects that there is a need to shift the gateway function (the handoff in the TCP layer) to a new gateway device (at a visited site), the radio terminal transmits to the gateway device at a visited site a TCP handoff request containing the identifier of this radio terminal and the identifier of the previously used gateway device.

When this request for handoff in the TCP layer is received by the gateway device at a visited site of the radio terminal, the handoff between base stations by the radio terminal is completed, and the fact that there is a need to shift the gateway function is then recognized, and the transfer of data which are already transmitted to the previously used gateway device but for which no acknowledge has been received and the TCP connection state information is requested. Then, the shifting of the gateway function described above is carried out.

Figure 12:
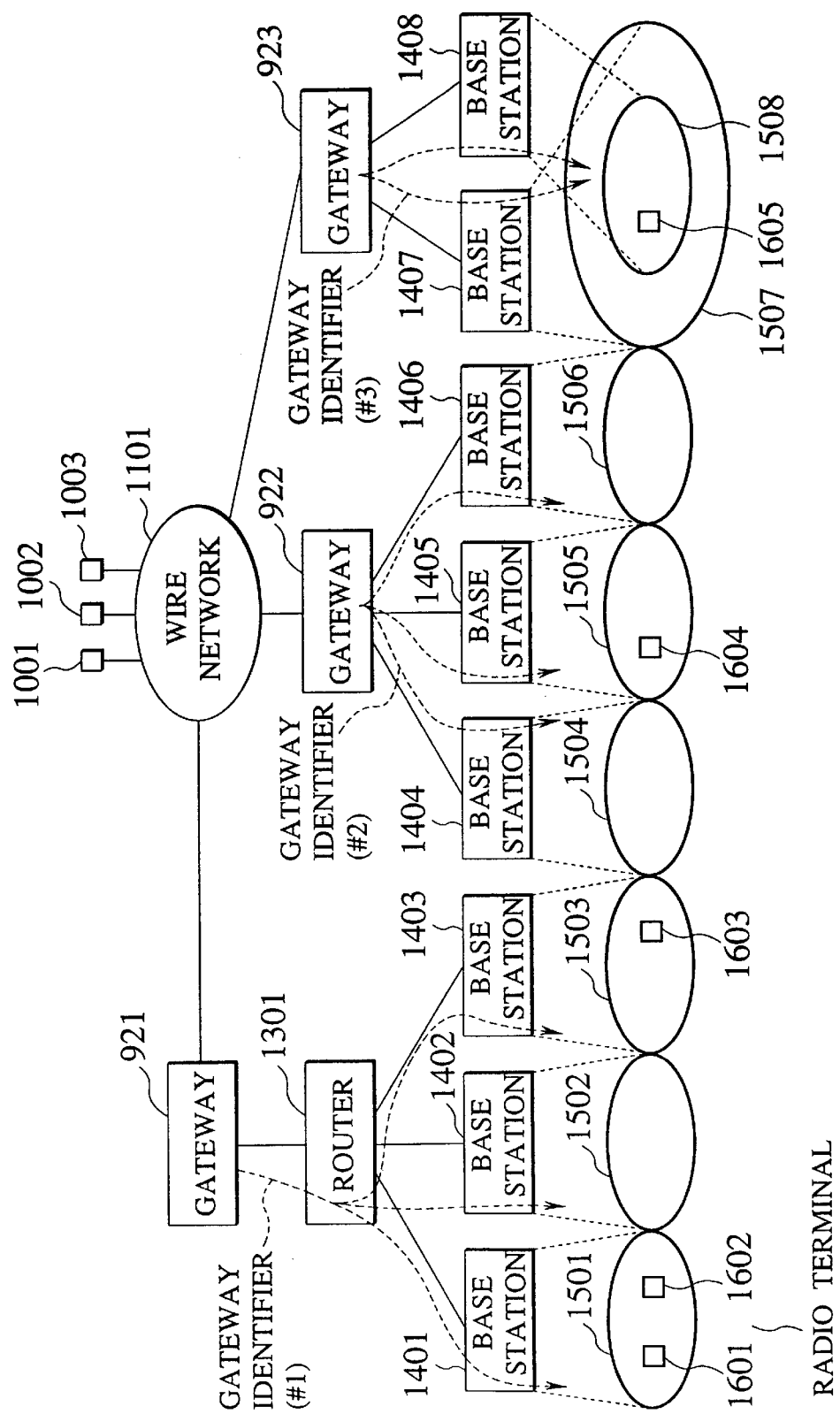
FIG. 12 is a schematic diagram for explaining the operation of gateway devices according to one embodiment of the present invention.

Next, a method for broadcasting the identifier from the gateway device as shown in FIG. 12 instead of broadcasting the subnet identification number from the FA or the DHCP server via base stations as described above will be described. The configuration of the communication network shown in FIG. 12 is basically the same as that of the first communication network shown in FIG. 2.

Each one of the gateway devices 921 to 923 broadcasts its identifier (such as IP address) via base stations, and the radio terminal regularly receives this broadcast information and detects that there is a need to shift the gateway function when it is different from the identifier of the gateway device that was carrying out the relay connection of the TCP connection previously. In this case, the subsequent TCP handoff procedure is the same as described above.

In addition, the radio TCP layer 600 and the TCP layer 620 of the gateway device 900 process a probe segment by using a persist timer and a keep alive timer of the TCP as follows.

In general, the window probe segment generated at a time of the expiration of the persist timer is transmitted in order to enable the transmitting side to check the reason why the receiving side does not notify the opening of the receiving window, as either "ack" for notifying the opening has been lost or it just happened to be that way because there is actually no space in a TCP buffer. A buffer of the radio TCP layer 600 viewed from the radio terminal 1601–1605 and a buffer of the TCP layer 620 viewed from the wire terminals 1001–1003 are targets of "probe" so that the radio TCP layer 600 and the TCP layer 620 make responses to the window probe segment as usual. Namely, a receiving window size to be notified is determined according to a vacant buffer amount, and its value is notified by "ack". At the same time, the window probe segment may be relayed from the wire side to the radio side or from the radio side to the wire side via the TCP relay unit 610. Even in the case of not relaying, when the persist timer is operated at the radio TCP layer 600 and the TCP layer 620 of the gateway device so as to transmit the window probe, it is possible to avoid a situation where the data transmission becomes impossible as a state of an incorrect receiving window size remains in the radio TCP layer 600 and the TCP layer 620 of the gateway device despite of the fact that a buffer of the TCP layer in the radio terminal 1601–1605 or the wire terminal 1001–1003 is vacant.

In general, "probe" generated at a time of the expiration of the keep alive timer is transmitted in order to check the reason why no activity is taking place in the TCP connection for a long time, as either the terminal has dropped or this TCP connection is no longer maintained as the terminal has been re-activated after dropping once. Consequently, it is against the original intention to make a response to this "probe" from the gateway device on behalf of the terminal. For this reason, the radio TCP layer 600 and the TCP layer 620 of the gateway device do not make any response to this "probe" and simply relays it to the other side via the TCP relay unit 610. Here, however, the radio TCP layer 600 and the TCP layer 620 stores the relayed TCP segment content so that, when a response to this "probe" is returned, this response is relayed as it is (in contrast to the handling of "ack" with respect to the ordinary transmission, which is terminated once).

In addition, when either the radio side TCP connection or the wire side TCP connection that constitutes the currently relayed TCP connection is disconnected, the other one is also disconnected.

Next, the application relay server 810, 820 will be described with reference to FIG. 1. When the IP datagram (contained in the application protocol data) is received from the radio TCP input unit 601 or the TCP input unit 621, the application relay server 810 or 820 carries out the processing specified in that application protocol, and if necessary, requests the TCP output unit 622 or the radio TCP output unit 602 to set up a second TCP (or radio TCP) connection. An exemplary case for setting up the second TCP (or radio TCP) connection is the case where data requested by the user does not exist in the cache 811 or 821.

Next, the radio terminal 1600 will be described with reference to FIG. 3. The radio IF unit 300 of the radio terminal 1600 realizes the so called datalink layer function, but the radio IF unit 300 according to the present invention also carries out the operation partially based on information of the TCP layer and the IP layer. In particular, the following is worth mentioning.

The radio IF output unit 302 contains an IP datagram segmentation unit 303 for segmenting the IP datagram into a plurality of datalink frames as shown in FIG. 4, and a priority level control unit 304 for transmitting a datalink frame containing an IP datagram with a higher priority level prior to a datalink frame containing an IP datagram with a lower priority level when an IP datagram with a higher priority level for transmission appears while transmitting a plurality of datalink frames that constitute an IP datagram with a lower priority level. The IP datagram segmentation unit 303 also has a TCP/IP header compression function. They operates in pair with the IP datagram reassembling unit 203, 223 of the radio IF input unit 200, 220 of the gateway device 900. Here, an IP datagram with a higher priority level is supposed to be an IP datagram containing a pure "ack" ("ack" which has a TCP header alone and contains no data) in the payload, and by using this, it becomes possible to improve the performance of the TCP as already described above.

In order to realize these functions, the following method can be used for example. The priority level is judged at the upper layer, the IP layer or the TCP layer, and the upper layer attaches a tag for identifying the priority level to each IP datagram or transmits each IP datagram to a queue of the datalink layer which is provided for each priority level, so that it can be identified at the priority level control unit 304 of the datalink layer. When the IP datagram is transmitted to the queue of the datalink layer, the control is given to the datalink layer. The IP datagram segmentation unit 303 segments this IP datagram into one or more datalink frames. In the link header, an identifier for uniquely identifying the IP datagram (during an appropriate period of time) is contained. The priority level control unit 304 requests the transmission of datalink frames with higher priority level to the hardware by looking at the queue. Then, the control is given to the upper layer once. If the upper layer has the IP datagram to be transmitted, that IP datagram is transmitted to the queue of the datalink layer and the processing similar to the above described is carried out. If the upper layer does not have the IP datagram to be transmitted, the control is returned to the datalink layer by an interruption from the hardware after the completion of the transmission of the datalink frame that was transmitted earlier, and the priority level control unit 304 requests the hardware to transmit one datalink frame with higher priority level that is present in the queue.

Note that, in the case where the bandwidth in an output direction from the radio terminal is narrow which is the case where this segmentation and priority control scheme becomes particularly effective, the upper layer does not cause a bottleneck in the transmission processing so that it is considered that the datalink layer which causes a bottleneck is where the queue is formed by transmission data. Consequently, it can be said that the datalink layer is an appropriate place for carrying out the priority control of transmission data.

FIG. 5 shows an exemplary datalink frame transmission, where the second datalink frame contains an IP datagram (pure "ack") with higher priority level.

The TCP layer of the radio terminal 1600 (which collectively refers to the TCP layer 710, the radio TCP layer 700, and the TCP selection unit 720) is different from the ordinary TCP layer in the following points.

The radio TCP layer 700 realizes the transport layer protocol that is modified for radio use as already described above. In addition, in the case where the correspondent is operating as an ordinary TCP at a time of TCP connection set up, the control of that connection is handed over to the TCP layer 710.

The TCP selection unit 720 determines whether communications using the ordinary TCP are to be carried out or communications using the radio TCP are to be carried out, according to an information which can specify or estimate the application 860, in response to an explicit request by the radio compatible application 850 or without any explicit request. Here, the TCP connection is set up by not using the relay at the TCP layer or the above by the gateway device in the case of using the ordinary TCP or by using the relay at the TCP layer or the above by the gateway device in the case of using the radio TCP. The criteria for determination of the relay method is the same as that already described for the gateway device.

In the application layer of the radio terminal 1600, the radio compatible application 850 is an application which has a function for explicitly requesting the selection between the radio TCP and the TCP to the TCP selection unit 720, while the application 860 is an application which does not make an explicit request to the TCP selection unit 720.

Figure 13:
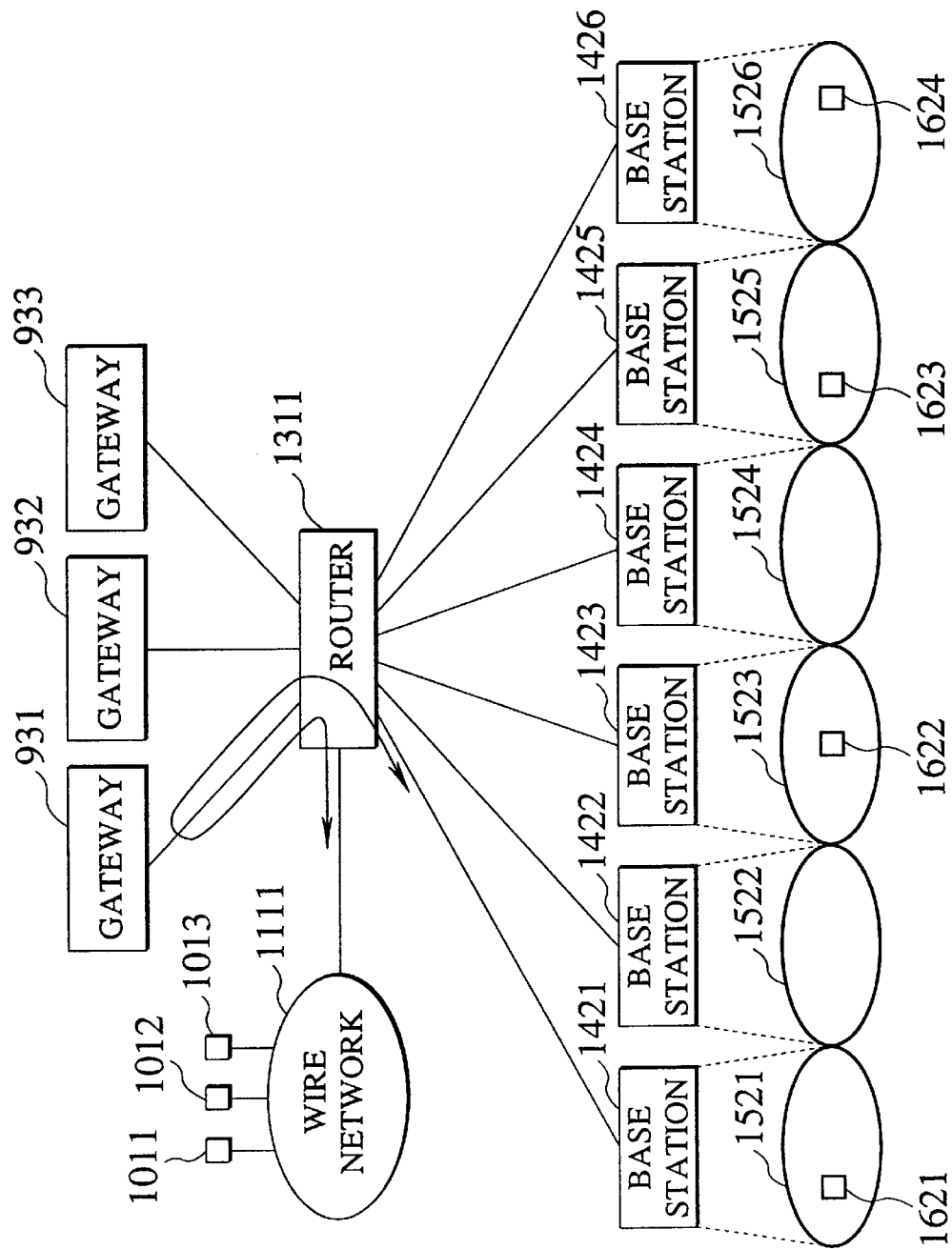
FIG. 13 is a schematic diagram showing a configuration of a communication network which constitutes the third embodiment of the present invention.

Next, FIG. 13 shows an exemplary configuration of a third communication network which constitutes the third embodiment of the present invention. This third communication network is an example which utilizes a router in order to distribute loads of the transport layer relaying or the application layer relaying over a plurality of gateway devices.

A router 1311 inter-connects a wire network 1111 accommodating wire terminals 1011 to 1013, gateway devices 931 to 933, and base stations 1421 to 1426 that respectively cover radio service areas 1521 to 1526. The router 1311 carries out the routing according to the method to be described below, such that the radio terminal 1621–1624 can carry out exchange of IP datagrams with the wire terminal 1011–1013 through one of the gateway devices 931–933 that is allocated to that radio terminal.

Figure 14:
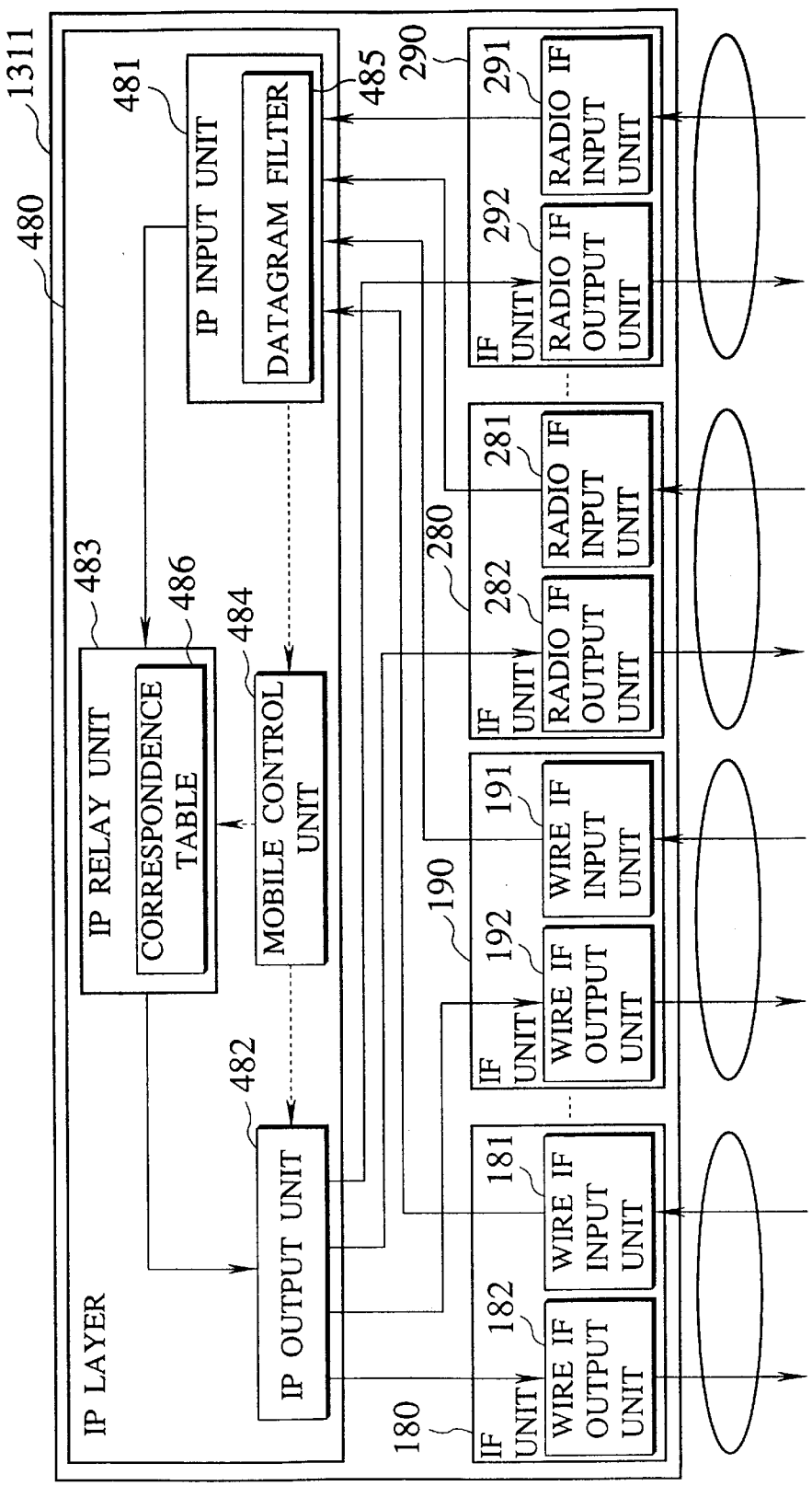
FIG. 14 is a block diagram showing a configuration of a router device according to one embodiment of the present invention.

FIG. 14 shows an exemplary configuration of the router 1311, where wire IF units 180 and 190 are connected to the wire network 1111 or the gateway devices 931–933, while radio IF units 280 and 290 are connected to the base stations 1421–1426, and an IP layer 480 outputs IP datagrams entered from these IFs to appropriate IFs according to a routing table in an IP relay unit 483.

This router 1311 is characterized in that the IP relay unit 483 has a correspondence table 486 indicating the correspondence between the ratio terminals 1621–1624 and the gateway devices 931–933.

The correspondence between the radio terminals 1621–1624 and the gateway device 931–933 can be made when the radio terminal 1621–1624 is detected to be located in the radio service area 1521–1526 or at a time of carrying out the subscription procedure for the radio terminal 1621–1624. In the former case, an IP datagram for notifying the detection of a new radio terminal 1621–1624 by the base station is transferred to a mobile control unit 484 by a datagram filter 485 of the router 1311. The mobile control unit 484 establishes a correspondence between the notified radio terminal 1621–1624 and the gateway device 931–933 according to a prescribed rule, and registers this correspondence in the correspondence table 486. Here, the prescribed rule is defined with an aim of uniformly distributing loads according to the loads of the gateway devices 931–933 in an immediately previous period, for example.

Figure 15:
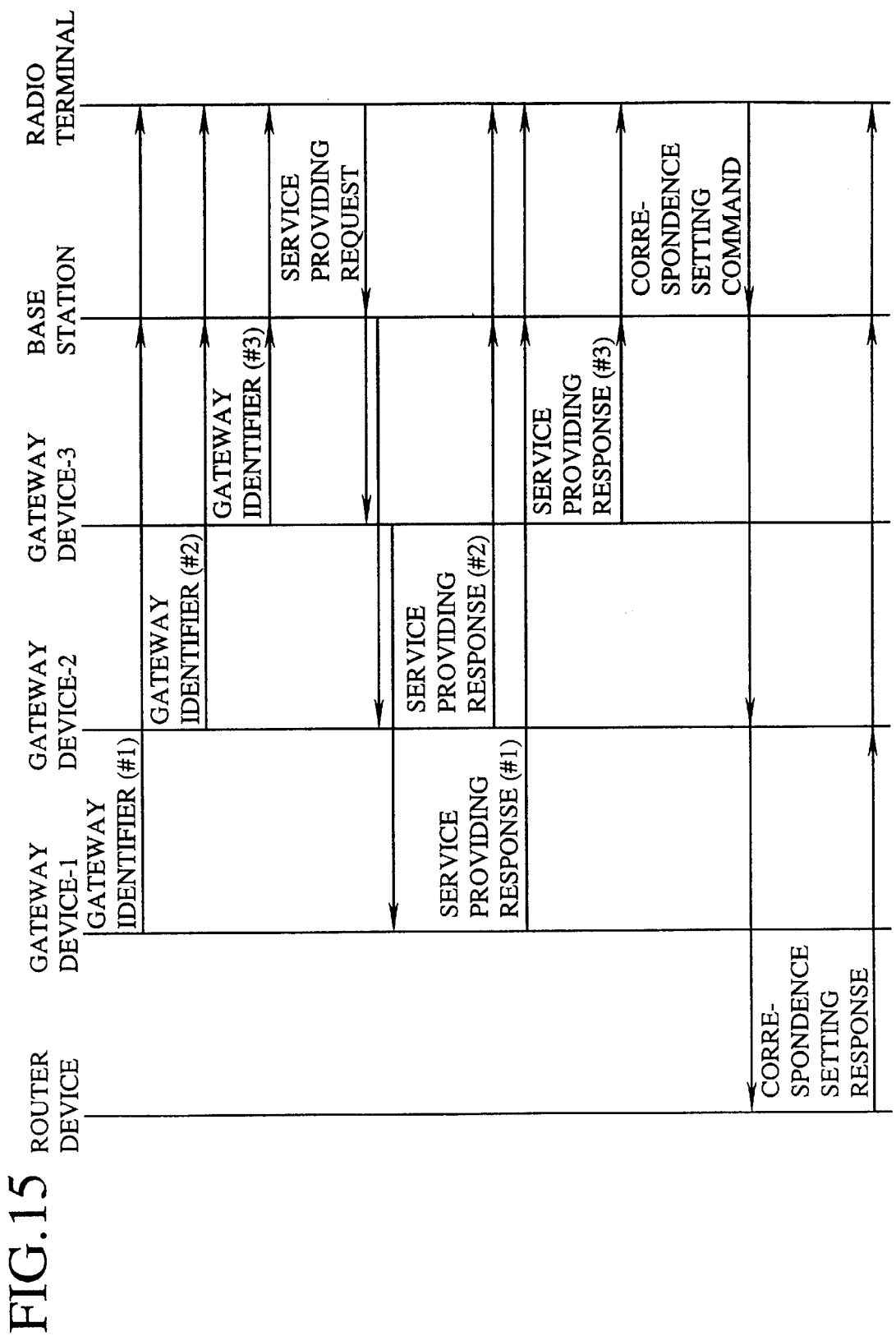
FIG. 15 is a sequence chart for explaining the operation of gateway devices according to one embodiment of the present invention.

Also, as described above, the gateway device 921–923 of FIG. 12 broadcast the identifier (such as IP address) of that gateway device via the base station 1401–1408, and the radio terminal 1601–1604 regularly receive this broadcast information, so that it becomes possible to recognize the gateway device that accommodates that base station. In the case where there are a plurality of gateway devices that accommodate one base station, as shown in FIG. 15 for example, the identifier of each gateway device is broadcast via the base stations and the radio terminal that received this broadcast information transmits a signal for service providing request to all these gateway devices. The gateway device that received this request transmits a signal for service providing response to the radio terminal, and it can be judged that the gateway device that transmitted the response most quickly has a lightest load, for example, so that this gateway device can be selected as a gateway device to be set in correspondence with the radio terminal.

In the case of establishing the correspondence between the radio terminal 1621–1624 and the gateway device 931–933 at a time of carrying out the subscription procedure for the radio terminal 1621–1624, the correspondence table 486 is set up by a remote network management device (not shown). The set up may be made via the mobile control unit 484 as described above, or via a management application (not shown) in the router 1311.

The routing of an IP datagram using the correspondence 486 that is set up in this manner will now be described.

Here, the transmission of IP datagram from the wire terminal 1011–1013 to the radio terminal 1621–1624 will be classified as follows.

(W1) A case where an IP address of the radio terminal 1621–1624 is directly written as a destination in the header of an IP datagram to be transmitted by the wire terminal 1011–1013.

(W2) A case of using the so called tunnelling technique, where the header of an IP datagram to be transmitted by the wire terminal 1011–1013 has an IP address of the router 1311 or the gateway device 931–933 as a destination, and an IP datagram (or its variant) is further encapsulated in its IP payload, and an address of the radio terminal 1621–1624 is described as a destination in the header of the encapsulated IP datagram.

(W2-1) A case where the destination address is the router 1311.

(W2-2) A case where the destination address is the gateway device 931–933 (that is set in correspondence to the radio terminal 1621–1624).

The cases of (W1) and (W2-1) require the operation of the router 1311 different from usual at a time of routing the IP datagram from the wire terminal 1011–1013 to the radio terminal 1621–1624. In the case of (W1), the IP datagram is routed to the gateway device 931–933 corresponding to the radio terminal 1621–1624 that is a destination in the header of the IP datagram according to the correspondence table 486 by the IP relay unit 483. In the case of (W2-1), the encapsulated IP datagram is taken out at the IP input unit 481 of the router 1311 and then the operation similar to that of (W1) is carried out. In the case of (W1), the IP datagram to be transmitted by the gateway device 931–933 after the conversion and relaying also contains the radio terminal 1621–1624 as a destination in the header similarly as the IP datagram transmitted from the wire terminal 1011–1013, so that there is a need to route the IP datagrams having the same destination address to different paths. The former one and the latter one can be distinguished according to a difference in the input IF or an information such as a source MAC address, so that such a routing is possible.

On the other hand, the transmission of the IP datagram from the radio terminal 1621–1624 to the wire terminal 1011–1013 is classified as follows.

(R1) A case where an IP address of the wire terminal 1011–1013 is directly written as a destination in the header of an IP datagram to be transmitted by the radio terminal 1621–1624.

(R2) A case of using the so called tunnelling technique, where the header of an IP datagram to be transmitted by the radio terminal 1621–1624 has an IP address of the router 1311 or the gateway device 931–933 as a destination, and an IP datagram (or its variant) is further encapsulated in its IP payload, and an address of the wire terminal 1011–1013 is described as a destination in the header of the encapsulated IP datagram.

(R2-1) A case where the destination address is the router 1311.

(R2-2) A case where the destination address is the gateway device 931–933 (that is set in correspondence to the radio terminal 1621–1624).

The cases of (R1) and (R2-1) require the operation of the router 1311 different from usual at a time of routing the IP datagram from the radio terminal 1621–1624 to the wire terminal 1011–1013. In the case of (R1), the IP datagram is routed to the gateway device 931–933 corresponding to the radio terminal 1621–1624 that is a source in the header of the IP datagram according to the correspondence table 486 by the IP relay unit 483. In the case of (R2-1), the encapsulated IP datagram is taken out at the IP input unit 481 of the router 1311 and then the operation similar to that of (R1) is carried out. In the case of (R1), the IP datagram to be transmitted by the gateway device 931–933 after the conversion and relaying also contains the wire terminal 1011–1013 as a destination in the header similarly as the IP datagram transmitted from the radio terminal 1621–1624, so that there is a need to route the IP datagrams having the same destination address to different paths. The former one and the latter one can be distinguished according to a difference in the input IF or an information such as a source MAC address, so that such a routing is possible.

Figure 16:
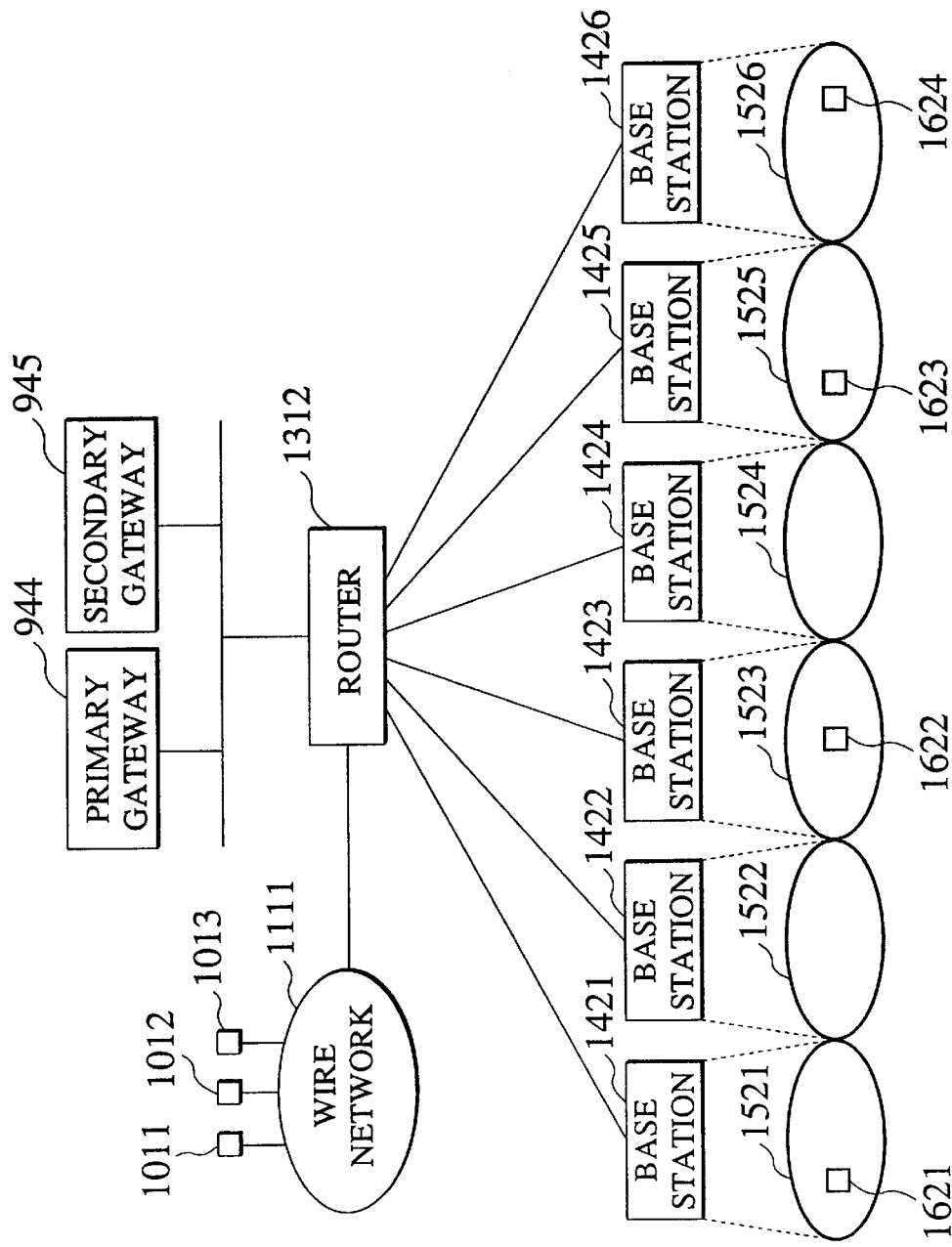
FIG. 16 is schematic diagram showing a configuration of a communication network which constitutes the fourth embodiment of the present invention.

Next, FIG. 16 shows an exemplary configuration of a fourth communication network which constitutes the fourth embodiment of the present invention. The configuration of this fourth communication network is characterized in that the gateway device is doubled in order to improve the reliability of the gateway function. Besides the doubled gateway devices, the configuration of FIG. 16 is similarly to the configuration of the third communication network of FIG. 13.

A router 1312 inter-connects a wire network 1111 accommodating wire terminals 1011 to 1013, gateway devices 944 and 945, and base stations 1421 to 1426 that respectively cover radio service areas 1521 to 1526. The router 1312 carries out the routing according to the method similar to that described above for the third communication network, such that the radio terminal 1621–1624 can carry out exchange of IP datagrams with the wire terminal 1011–1013 through the gateway devices 944 and 945.

The router 1312 of the fourth communication network differs from the router 1311 of the third communication network in that the IP datagram transmitted to the router 1312 by the wire terminal 1011–1013 with the radio terminal 1621–1624 as its final destination and the IP datagram transmitted to the router 1312 by the radio terminal 1621–1624 with the wire terminal 1011–1013 as its final destination are multicast to the gateway devices 944 and 945 by the router 1312.

There is also a difference in the physical connection relationship such that the router 1311 has an interface for each gateway device whereas the router 1312 is accommodating the gateway devices 944 and 945 by a shared-media network (such as Ethernet), but this difference is not an essential.

Now, the method by which the router 1312 carries out the multicast to the gateway devices 944 and 945 will be described. In the cases of (W2-2) and (R2-2) of the classification described above for the third communication network, the gateway device is the destination address so that it suffices to use an IP multicast address which contains the gateway devices 944 and 945 in its host group as a destination address. This host group is set up in advance by some method. At a time of resolving this IP multicast address into a MAC address of the shared-media network, it is resolved into the multicast address of the shared-media network that contains the gateway devices 944 and 945. This address resolution method is similar to the usual IP multicast. Here, in the configuration of the gateway device 944, 945 shown in FIG. 17, a multicast reception function 113 has a function for receiving a frame which has the multicast address of the shared-media network.

In the cases of (R1), (R2-1), (W1) and (W2-1), the destination is a single-cast IP address, and at a time of resolving this single-cast IP address into a MAC address of the shared-media network, it suffices to resolve this into the multicast address of the shared-media network that contains the gateway devices 944 and 945. This address resolution method is difference from the usual method which resolves a single-cast IP address into a single-cast MAC address.

Note that, because a network that connects the router 1312 and the gateway devices 944 and 945 are the shared-media network, even in the case where the router 1312 resolves a single-cast IP address into a single-cast MAC address, it is possible to obtain the similar effect by setting the multicast reception function 113 of the wire IF input unit 111 of the gateway device 944, 945 such that the gateway device 944 receives frames destined to itself as well as frames having a MAC address destined to the gateway device 945, while the gateway device 945 receives frames destined to itself as well as frames having a MAC address destined to the gateway device 944.

Figure 17:
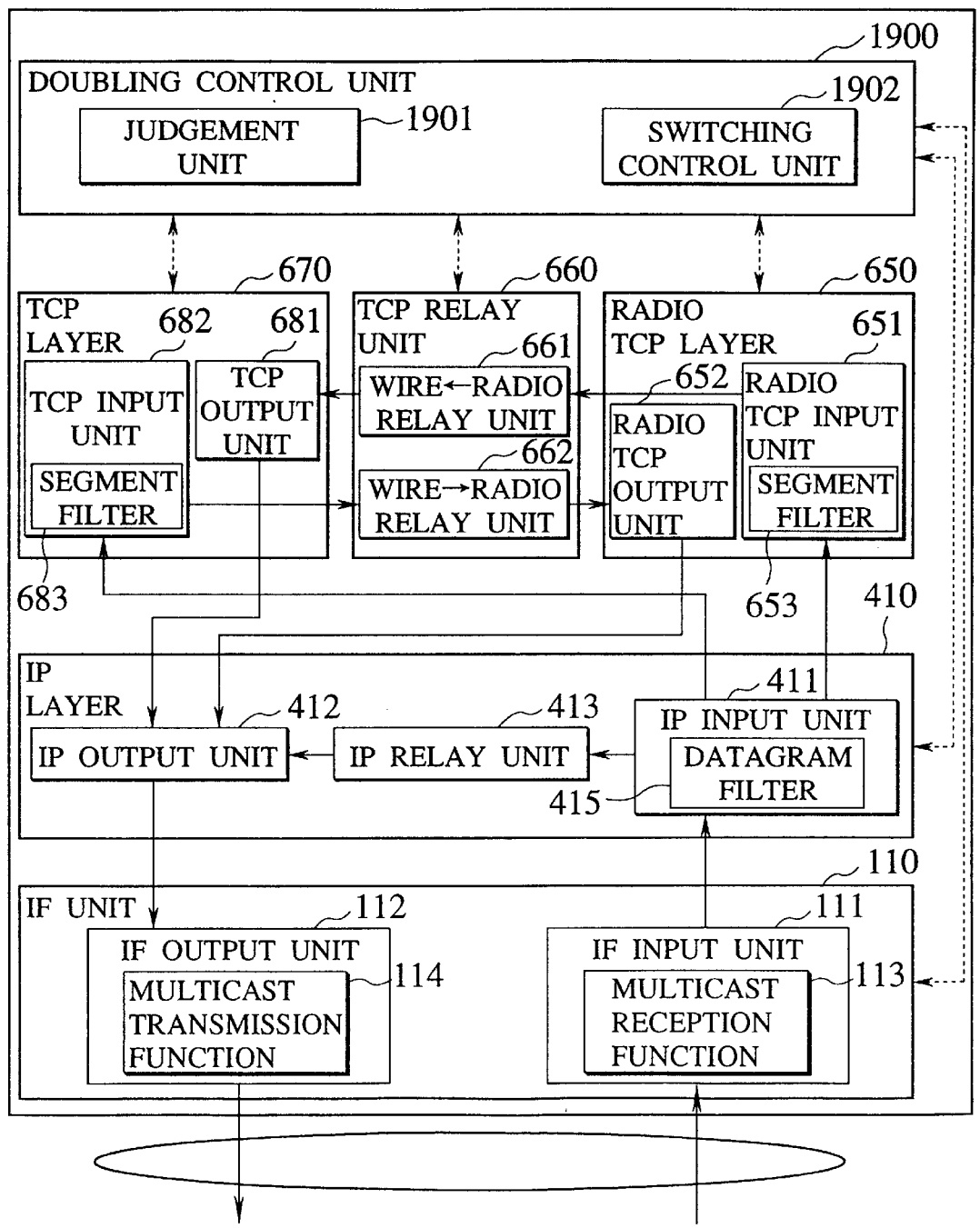
FIG. 17 is a block diagram showing a configuration of a gateway device capable of being doubled according to one embodiment of the present invention.

FIG. 17 shows an exemplary configuration of the gateway device 944, 945 which is capable of being doubled.

Each gateway device 944, 945 has a multicast reception function 113 provided in a wire IF input unit 111 and a multicast transmission function 114 in a wire IF output unit 112, at a wire IF unit 110. For example, an IF card of the Ethernet that is the shared-media network has such a multicast function, but the present invention is characterized in that the IP datagram (containing TCP or radio TCP segments) to be transmitted by frames having a usual single-cast destination MAC address is multicast by frames having a multicast destination MAC address.

The IP layer 410 differs from the IP layer 400 of the gateway device 900 in that there is no mobile control unit and it is subjected to the control by a doubling control unit 1900, but the former difference is not essential, and it is also possible to use the doubled gateway device that has the mobile control unit. When the IP layer 410 is commanded to operate as an IP layer of a primary gateway device from the doubling control unit 1900, the IP layer 410 carries out the relaying of datagrams to be relayed by the IP layer. When the IP layer 410 is commanded to operate as an IP layer of a secondary gateway device from the doubling control unit 1900, the IP layer 410 discards datagrams silently, without carrying out the relaying even for those datagrams which would normally be judged as datagrams to be relayed by the IP layer.

A radio TCP layer 650, a TCP layer 670 and a TCP relay unit 660 differs from the radio TCP layer 600, the TCP layer 620 and the TCP relay unit 610 respectively in that they give necessary information to the doubling control unit 1900 and they are subjected to the control by the doubling control unit 1900. These features will now be described in detail.

First, assuming that the gateway device 944 is the primary gateway device and the gateway device 945 is the secondary gateway device, the case of relaying the TCP connection between the wire terminal 1011 and the radio terminal 1621 will be described.

In this case, the wire terminal 1011 and the primary gateway device 944 that mutually receive and respond to TCP segments are in a peer relationship of the TCP, while the radio terminal 1621 and the primary gateway device 944 that mutually receive and respond to radio TCP segments are in a peer relationship of the radio TCP. The secondary gateway device 945 receives these exchanged TCP segments and checks their contents but does not respond to the received TCP segments unless a trouble occurs in the primary gateway device 944 so that it is not in a peer relationship.

Now suppose that the radio terminal 1621 made a connection set up request of the radio TCP. A SYN segment of the radio TCP is multicast to the primary gateway 944 and the secondary gateway device 945 via a route "a" of FIG. 18. The primary gateway device 944 multicasts a SYN segment of the TCP to the wire terminal 1011 and the secondary gateway device 945 via a route "d" of FIG. 18, as a connection set up request of the TCP. A judgement unit 1901 of the secondary gateway device 945 is anticipating the reception of this SYN segment when the SYN segment of the radio TCP was received, and judges that the primary gateway device 944 is operating normally when the anticipated segment is received.

Figure 18:
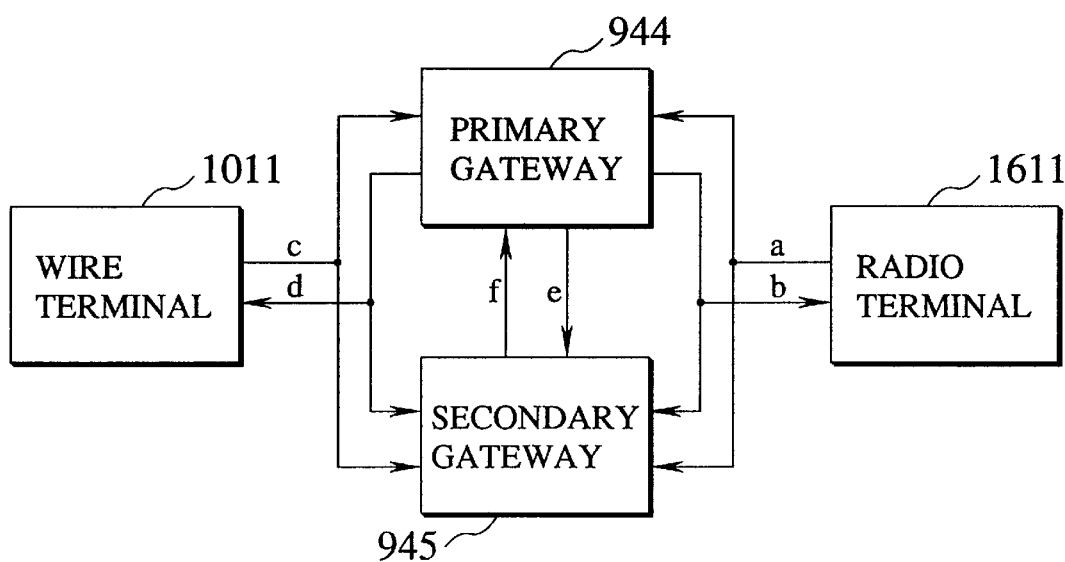
FIG. 18 is a diagram showing message routes among doubled gateway devices, a radio terminal and a wire terminal according to one embodiment of the present invention.

If the anticipated segment is not received for a prescribed period of time, the judgement unit 1901 sends an operation check message to the primary gateway device 944 via a route "f" of FIG. 18. In response to this, if the primary gateway device 944 does not return a response via a route "e" of FIG. 18, the judgement unit 1901 of the secondary gateway device 945 judges that the primary gateway is in trouble, and commands a switching control unit 1902 to configure the own device as the primary gateway device. The switching control unit 1902 commands the radio TCP layer 650, the TCP relay unit 660 and the TCP layer 670 to operate as the primary gateway device. in the case currently considered, the TCP layer 670 transmits a SYN segment of the TCP to the wire terminal 1011.

Returning again to the case where the primary gateway device 944 is operating normally, a SYN-ACK segment of the TCP returned by the wire terminal 1011 is multicast to the primary gateway device 944 and the secondary gateway device 945 via a route "c" of FIG. 18 by the router 1312. Upon receiving this, the primary gateway device 944 multicasts an ACK segment to the wire terminal 1011 and the secondary gateway device 945 via a router "d" of FIG. 18. The judgement unit 1901 of the secondary gateway device 945 judges the operation state of the primary gateway device 944 according to presence or absence of a reception of this ACK segment, and carries out the switching if necessary, similarly as described above.

In addition, the primary gateway device 944 returns a SYN-ACK message of the radio TCP to the radio terminal 1621 and the secondary gateway device 945 via a route "b" of FIG. 18. The judgement unit 1901 of the secondary gateway device 945 judges the operation state of the primary gateway device 944 according to presence or absence of a reception of this SYN-ACK message, and carries out the switching if necessary, similarly as described above. An ACK segment of the radio TCP transmitted by the radio terminal 1621 is multicast to the primary gateway device 944 and the secondary gateway device 945 via a route "a" of FIG. 18 by the router 1312.

At this point, the bidirectional TCP connection between the radio terminal 1621 and the wire terminal 1011 that is to be relayed by the primary gateway device 944 is established.

Now the case of transferring data from the wire terminal 1011 to the radio terminal 1621 will be considered. A TCP segment containing data to be transmitted is multicast from the wire terminal 1011 to the primary gateway device 944 and the secondary gateway device 945 via a route "c" of FIG. 18. The primary gateway device 944 multicasts an ACK segment for acknowledging receipt of this data to the wire terminal 1011 and the secondary gateway device 945 via a route "d" of FIG. 18. The judgement unit 1901 of the gateway device 945 judges the operation state of the primary gateway device 944 according to presence or absence of a reception of this ACK segment, and carries out the switching if necessary, similarly as described above.

In addition, the primary gateway device 944 multicasts a radio TCP segment containing data to be transmitted to the radio terminal 1621 and the secondary gateway device 945 via a route "b" of FIG. 18. The judgement unit 1901 of the secondary gateway device 945 is anticipating this radio TCP segment containing data, so that it judges the operation state of the primary gateway device 944 according to presence or absence of a reception of this radio TCP segment, and carries out the switching if necessary, similarly as described above. The radio terminal 1621 multicasts an ACK segment of the radio TCP for acknowledging receipt of this data to the primary gateway device 944 and the secondary gateway device 945 via a route "a" of FIG. 18. When this ACK is not received, the primary gateway device 944 is supposed to carry out the retransmission due to time-out. When the primary gateway device 944 does not carry out the re-transmission as it should, the judgement unit 1901 of the secondary gateway device 945 checks the operation state of the primary gateway device 944, and carries out the switching and the re-transmission if necessary.

Now the case where the radio terminal 1621 requested a disconnection of the TCP connection will be considered. The radio terminal 1621 multicasts a FIN segment of the radio TCP to the primary gateway device 944 and the secondary gateway device 945 via a route "a" of FIG. 18. The primary gateway device 944 multicasts a FIN segment of the TCP to the wire terminal 1011 and the secondary gateway device 945 via a route "d" of FIG. 18. The judgement unit 1901 of the secondary gateway device 945 judges the operation state of the primary gateway device 944 according to presence or absence of a reception of this FIN segment, and carries out the switching if necessary, similarly as described above. An ACK segment of the TCP returned by the wire terminal 1011 in response to this is multicast to the primary gateway device 944 and the secondary gateway device 945 via a route "c" of FIG. 18 by the router 1312. The primary gateway device 944 multicasts an ACK segment of the radio TCP with respect to FIN to the radio terminal 1621 and the secondary gateway device 945 via a route "b" of FIG. 18. The judgement unit 1901 of the secondary gateway device 945 judges the operation state of the primary gateway device 944 according to presence or absence of a reception of this ACK segment, and carries out the switching if necessary, similarly as described above.

Next, a procedure for setting communications between a radio terminal and a wire terminal, between radio terminals, or between wire terminals, in correspondence to the gateway devices for carrying out the relay connection in the TCP layer or the application layer will be described with references to FIG. 9, FIG. 13 and FIG. 14.

In the following, an exemplary case of transferring messages by using IP (Internet Protocol) packets and transferring data by using arbitrary transport layer protocol on the network of FIG. 13 will be described.

FIG. 9 shows an exemplary configuration of a base station 1400 that can be used for each one of the base stations 1421–1426 of FIG. 13.

This base station 1400 of FIG. 9 comprises a control unit 1750 having a signal strength change notification unit 1751, a BER (Bit Error Rate) change notification unit 1752 and a terminal movement control unit 1753; a radio transmission and reception unit 1850 having a receiver 1851 that contains a signal strength measurement unit 1854, a transmitter 1852, and a duplexer 1853 for enabling the receiver 1851 and the transmitter 1852 to commonly use an antenna 1855; a BER measurement unit 1856; an IP layer 550 having an IP input unit 551 and an IP output unit 552; and a wire IF (interface) unit 150 having a wire IF input unit 151 and a wire IF output unit 152. In FIG. 9, solid lines indicate data flows while dashed lines indicate control flows.

The signal strength measurement unit 1854 measures a received signal strength for each radio terminal 1621–1624, and notifies the measured signal strength regularly to the control unit 1750.

The BER measurement unit 1856 measures the BER of signals flowing from the receiver 1851 to the wire IF output unit 152 for each radio terminal 1621–1624, and notifies the measured BER regularly to the control unit 1750.

Note here that the received signal strength and the BER are just examples of information indicating a radio communication state between the radio terminal and the base station.

The signal strength change notification unit 1751 of the control unit 1750 gives a message to the IP output unit 552, where the message has the router 1311 as its destination and contains the received signal strength for each radio terminal 1621–1624 obtained by the signal strength measurement unit 1854 and an identifier of a corresponding radio terminal 1621–1624.

Similarly, the BER change notification unit 1752 of the control unit 1750 gives a message to the IP output unit 552, where the message has the router 1311 as its destination and contains the BER for each radio terminal 1621–1624 obtained by the BER measurement unit 1856 and an identifier of a corresponding radio terminal 1621–1624.

As an identifier, an IP address allocated to each radio terminal 1621–1624 can be used, for example.

For a message to be transferred to the router 1311 through the IP output unit 552, a new ICMP (Internet Control Message Protocol) message may be defined. Namely, as an ICMP message for notifying an information indicating the radio communication state such as the received signal strength or the BER and the identifier of the radio terminal, new type and code can be allocated and a format for information content (the received signal strength or the BER and the identifier of the radio terminal) can be defined. This message may be notified from the base station 1400 to the router 1311 either regularly or only when the received signal strength or the BER exceeds a prescribed threshold.

FIG. 14 shows an exemplary configuration of the router 1311 of FIG. 13. This router 1311 of FIG. 14 generally comprises a plurality (only two are shown in FIG. 14) of wire IF units 180, 190 which are connected with the wire network 1111 and a plurality of gateway devices 931–933 respectively; a plurality (only two are shown in FIG. 14) of radio IF units 280, 290 which are connected with the base stations 1421–1426 respectively; and an IP layer 480.

Each wire IF unit 180, 190 comprises a wire IF input unit 181, 191 and a wire IF output unit 182, 192, while each radio IF unit 280, 290 comprises a radio IF input unit 281, 291 and a radio IF output unit 282, 292.

The IP layer 480 comprises an IP input unit 481 having a datagram filter 485, an IP output unit 482, an IP relay unit 483 storing a correspondence table 486, and a mobile control unit 484.

The message (ICMP message for example) for notifying the radio communication state that is transmitted from the base station reaches to the IP input unit 481 via the radio IF input unit 281 or 291. Then, the IP input unit 481 recognizes that this message is an ICMP message for notifying the radio communication state (which can be identified by the type and code of ICMP) by using the datagram filter 485. Then, the IP input unit 481 also recognizes that it is a message (IP datagram) to be transferred to one of the gateway devices 931–933 which is relaying the transport layer connection terminated at the radio terminal as identified by the identifier contained in that message, and gives it to the IP relay unit 483.

The correspondence table 486 of the IP relay unit 483 indicates a correspondence between IP addresses of the radio terminals 1621–1624 and IP addresses of the gateway devices 931–933 which are relaying the transport layer connections terminated at the radio terminals 1621–1624.

This correspondence can be established as follows, for example. When the terminal movement control unit 1753 of the base station 1421–1426 notifies to the mobile control unit 484 of the router device 1311 that the radio terminal 1621–1624 is newly discovered in one of the radio service areas 1521–1526 (including the case where the radio terminal turns the power on there), the mobile control unit 484 sets that radio terminal in correspondence to one of the gateway devices 931–933 according to a prescribed rule.

Now, the IP relay unit 483 obtains the IP address of one of the gateway devices 931–933 that corresponds to the IP address of the radio terminal contained in that message, from the correspondence table 486. Then, the IP relay unit 483 writes this IP address of the gateway device into an IP header of that message as a new destination of that message, and gives this message to the IP output unit 482.

The IP output unit 482 then transmits this message to one of the gateway devices 931–933 via the wire IF output unit 182 or 192 that corresponds to the destination of that message.

Note that the destination of the message entered into the IP input unit 481 is an address of the router 1311 so that it should be given to the upper layer normally. Consequently, the above described processing at the IP relay unit 483 (the processing for specifying a gateway device that corresponds to the radio terminal of the identifier contained in that message by referring to the correspondence table 486 and transferring that message to that identified gateway device) may be carried out at the upper layer. Namely, it is possible to provide a function for processing that message in the upper layer and give that message to this function instead of the IP relay unit 483.

Next, a procedure for adaptively controlling the transport layer protocol of the gateway device that carries out the relay connection of communications with the radio terminal according to the radio communication state between the radio terminal and the base station will be described with reference to FIG. 19.

Figure 19:
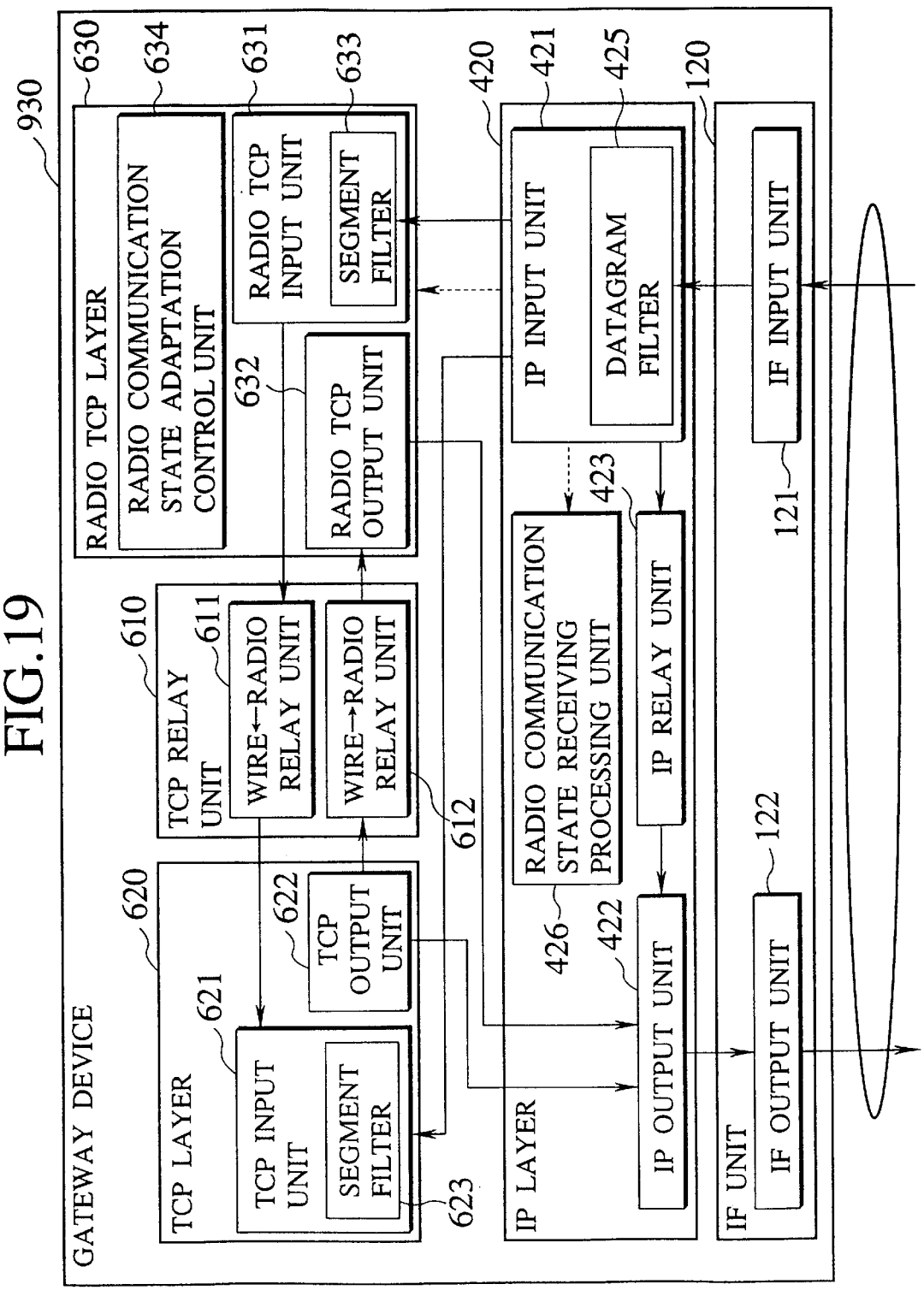
FIG. 19 is a block diagram showing a configuration of a gateway device according to one embodiment of the present invention.

FIG. 19 shows an exemplary configuration of a gateway device 930 that can be used for each one of the gateway devices 931–933 of FIG. 13.

This gateway device 930 of FIG. 19 generally comprises a wire IF unit 120, an IP layer 420, a TCP layer 620, a TCP relay unit 610 and a radio TCP layer 630.

The wire IF unit 120 comprises an IF input unit 121 and an IF output unit 122 which are connected to the router 1311.

The IP layer 420 comprises an IP input unit 421 having a datagram filter 425, an IP output unit 422, an IP relay unit 423, and a radio communication state receiving processing unit 426.

The TCP layer 620 comprises a TCP input unit 621 having a segment filter 623 and a TCP output unit 622.

The radio TCP layer 630 comprises a radio TCP input unit 631 having a segment filter 633, a radio TCP output unit 632, and a radio communication state adaptation control unit 634.

The TCP relay unit 610 comprises a relay unit 611 for converting the radio transport layer protocol into the wire transport layer protocol, and a relay unit 612 for converting the wire transport layer protocol into the radio transport layer protocol.

The message transferred from the router 1311 to the gateway device 930 reaches to the IP input unit 421 through the wire IF input unit 121 of the gateway device 930.

The IP input unit 421 recognizes that the entered message is a message for notifying the radio communication state by using the datagram filter 425, and sends this message to the radio communication state receiving processing unit 426.

The radio communication state receiving processing unit 426 extracts an identifier (such as IP address) of the radio terminal and an information regarding the radio communication state (such as the received signal strength or the BER for example) contained in the message, and notifies them to the radio TCP layer 630.

The radio communication state adaptation control unit 634 of the radio TCP layer 630 then adaptively changes the radio TCP operation according to that information regarding the radio communication state. For example, the maximum size of a radio TCP segment to be transmitted is made smaller when the BER becomes higher than a prescribed threshold (or when the received signal strength becomes lower than a prescribed threshold), and the maximum size of a radio TCP segment to be transmitted is made larger when the BER becomes lower than a prescribed threshold (or when the received signal strength becomes higher than a prescribed threshold).

Such a transport layer connection control command (a command for changing the size of a TCP segment, for example) is applied to the radio TCP output unit 632 such that each radio TCP segment that is subsequently transmitted from the wire→radio relay unit 612 of the TCP relay unit 610 will have its size changed to the size determined by the radio communication state adaptation control unit 634 at a time of output from the radio TCP output unit 632, and transmitted to the base station through the IP output unit 422 and the wire IF output unit 122.

Up to here, the case where the router 1311 sets the radio terminal identified by the identifier contained in the message in correspondence to one of the plurality of gateway devices according to the message for notifying the radio communication state that is transmitted from one of the base station 1421–1426 to the router 1311 (the case of specifying a gateway device that is a transfer target of the message for notifying the radio communication state) has been described.

Next, the case where the base station 1421–1426 sets the radio terminal in correspondence to one of the plurality of gateway devices will be described.

Figure 20:
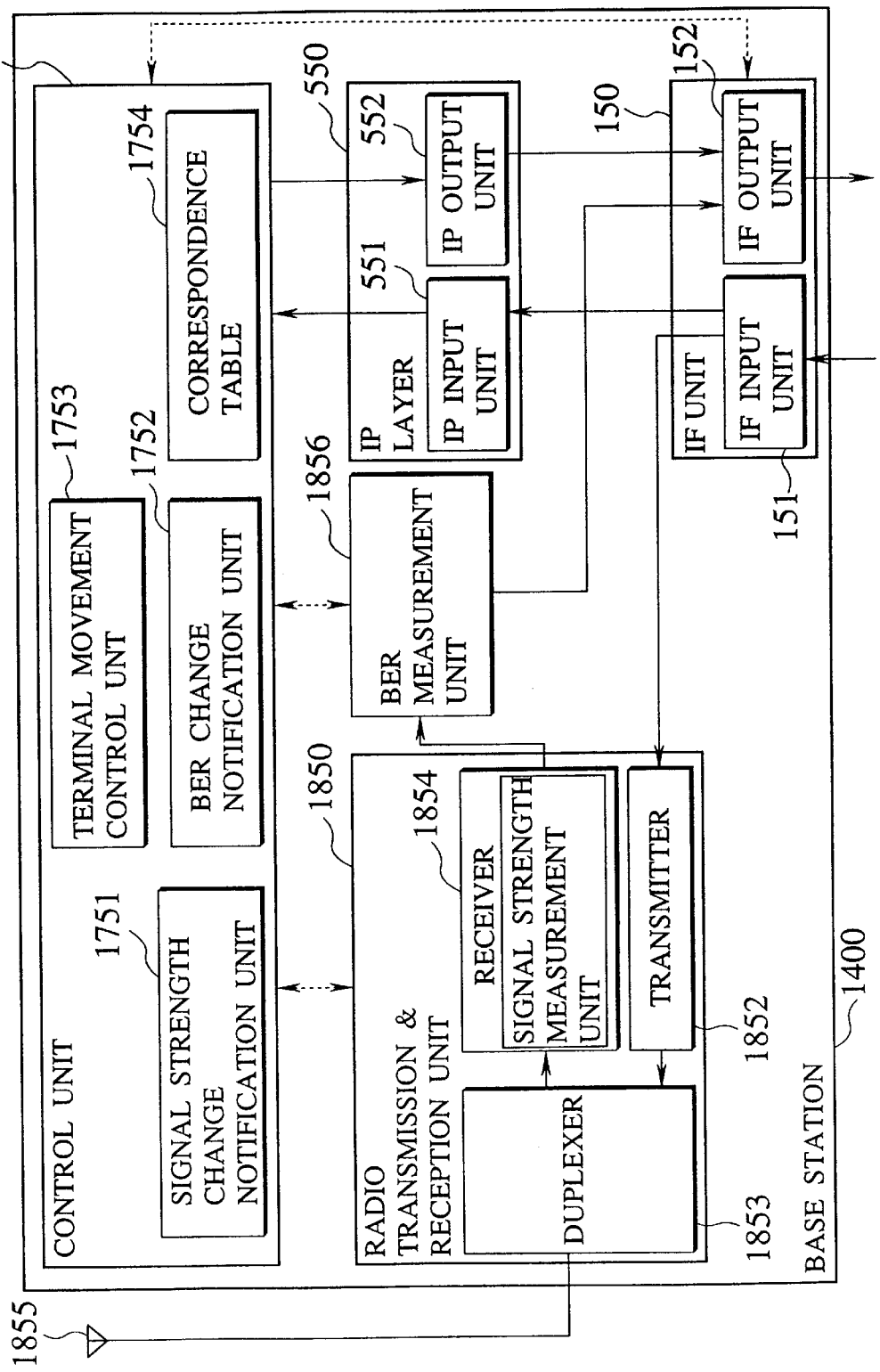
FIG. 20 is a block diagram showing a configuration of a base station device according to one embodiment of the present invention.

FIG. 20 shows another exemplary configuration of a base station 1400 that can be used for each one of the base stations 1421–1426 of FIG. 13. Here, the elements that are substantially the same as those of FIG. 9 are given the same reference numerals in FIG. 20 and only differences from FIG. 9 will be described. Namely, the configuration of FIG. 20 differs from that of FIG. 9 in that the control unit 1750 has a correspondence table 1754.

The correspondence table 1754 indicates a correspondence between IP addresses of the radio terminals 1621–1624 and IP addresses of the gateway devices 931–933 which are relaying the transport layer connections terminated at the radio terminals 1621–1624.

This correspondence can be established as follows, for example. Here, it is assumed that the router 1311 already has this correspondence in the correspondence table 486 by the separately specified procedure.

Then, when the terminal movement control unit 1753 of one of the base station devices 1421–1426 notifies to the router 1311 a message for notifying that one of the radio terminals 1621–1624 is newly discovered, the mobile control unit 484 of the router 1311 searches for an identifier (IP address) of one of the gateway devices 931–933 that is relaying the transport layer connection terminated at the radio terminal as identified by the identifier (IP address) contained in that received message, by referring to the correspondence table 486. Then, the mobile control unit 484 of the router 1311 transmits a prescribed response message containing this searched out identifier of the gateway device to the base station that transmitted the message for noting the discovery of the radio terminal earlier.

Then, at that base station, the response message from the router 1311 is received through the wire IF input unit 151 and the IP input unit 551, and the identifier of the gateway device is extracted from that response message. Then, the terminal movement control unit 1753 registers a correspondence between that identifier of the gateway device and that radio terminal in the correspondence table 1754.

On the other hand, the signal strength change notification unit 1751 of the control unit 1750 generates a message containing the received signal strength for that radio terminal obtained by the signal strength measurement unit 1854 and the identifier of that radio terminal, and gives this message to the IP output unit 552. At this point, the signal strength change notification unit 1751 searches out the identifier (IP address) of the gateway device that corresponds to the identifier of that radio terminal from the correspondence table 1754, and sets it as a destination of the generated message.

Similarly, the BER change notification unit 1752 of the control unit 1750 generates a message containing the BER for that radio terminal obtained by the BER measurement unit 1856 and the identifier of that radio terminal, and gives this message to the IP output unit 552. At this point, the BER change notification unit 1752 searches out the identifier (IP address) of the gateway device that corresponds to the identifier of that radio terminal from the correspondence table 1754, and sets it as a destination of the generated message.

When such a message is transmitted to the router 1311 through the IP output unit 552 and the wire IF output unit 152, the router 1311 handles it similarly as the usual IP packet by carrying out the routing to one of the gateway devices 931–933 that is specified by the IP address contained in the IP packet.

The operation of the gateway device 931–933 that received this message is such that the radio communication state adaptation control unit 634 of the radio TCP layer 630 adaptively changes the radio TCP operation according to the information regarding the radio communication state as described above.

Next, a method for processing control options used at a time of TCP connection establishing request from the radio terminal or the wire terminal will be described with references to FIG. 2 and FIG. 21.

Figure 21:
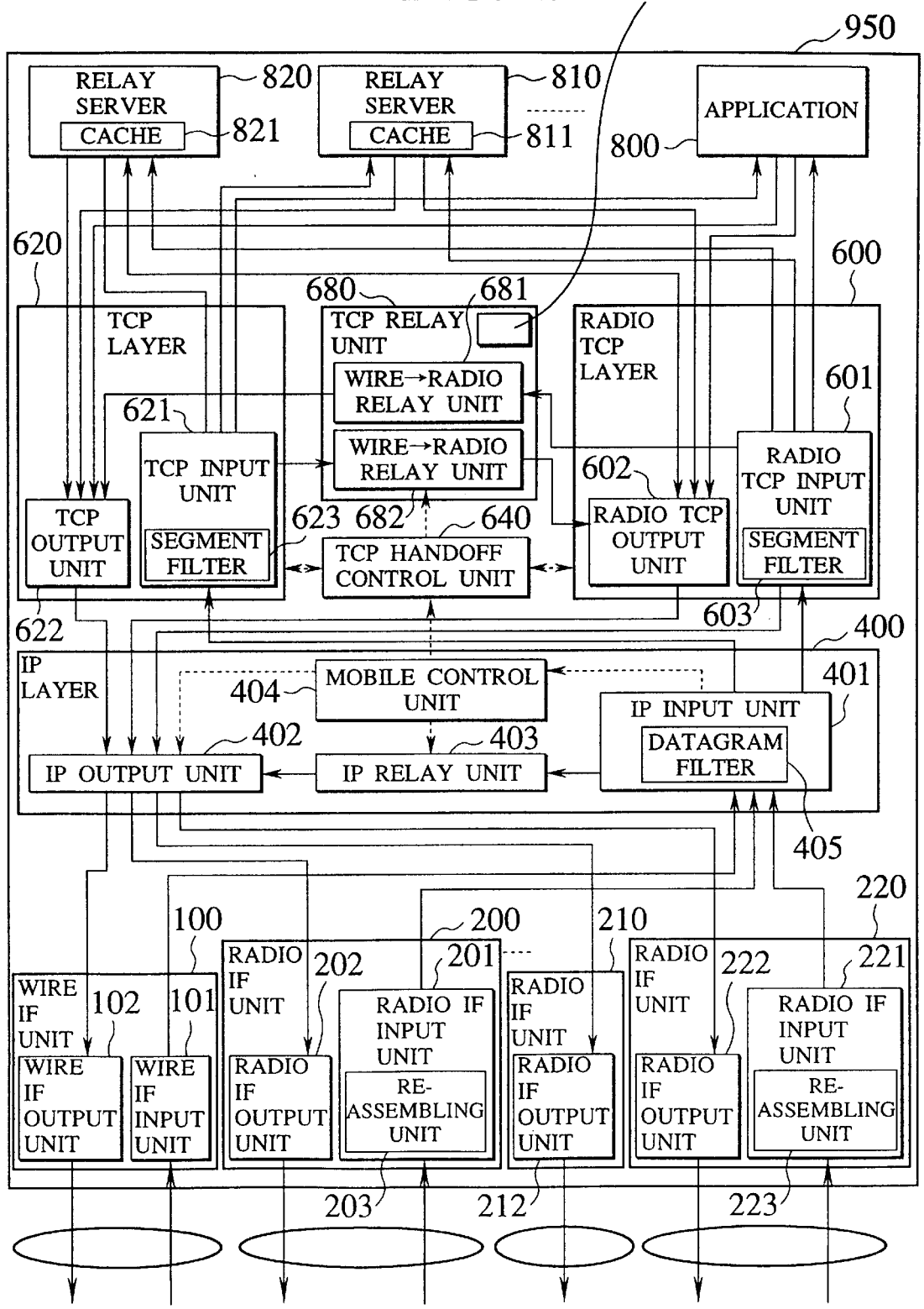
FIG. 21 is a block diagram showing a configuration of a gateway device according to one embodiment of the present invention.

FIG. 21 shows an exemplary configuration of a gateway device according to one embodiment of the present invention, where the elements that are substantially the same as those of FIG. 1 are given the same reference numerals in FIG. 21 and only differences from FIG. 1 will be described.

For example, in the communication network configuration shown in FIG. 2, suppose that the gateway device 901 has a configuration as shown in FIG. 21. In this case, when the gateway device 901 receives a packet for establishing a TCP connection with a request for an option h from some terminal 1001 in the wire network 1101, the gateway device 901 makes a response with respect to the option h to the terminal 1001 and establishes the connection with the terminal 1001 (here, the option h is assumed to be that which commands the path MTU discovery). At this point, what is requested as an option for this connection is recorded in an option table 683.

Next the gateway device 901 proceeds to the operation for establishing connection with the radio terminal 1601, for example, which is a correspondent with whom the terminal 1001 wishes to establish a connection. A TCP handoff control unit 640 in the gateway device 901 refers to the option table 683 at a time of generating a packet for connection establishing. In this way, the gateway device 901 confirms that the option h is requested, and searches for MTU on the route. However, in general, a packet size in the radio link is small compared with a packet size in the wire link, so that if MTU here is treated as on the route between the radio terminal 1601 and the wire terminal 1001, unnecessarily many data segmentations would be made in the wire network and as a result the link utilization efficiency would be lowered. For this reason, the option h is treated as unnecessary one at a time of establishing a connection with the radio terminal. Hence, the TCP handoff control unit 640 in the gateway device 901 requests a radio TCP output unit 602 in a radio TCP layer 600 to transmit to the radio terminal 1601 a packet for TCP connection establishing without adding anything to the option.

When this packet for TCP connection establishing is received, the radio terminal 1601 understands that there is no option, and transmits an acknowledgement and response packet with respect to this packet to the gateway device 901. In this way, the connection between the radio terminal 1601 and the gateway device 901 is established in a state of having no option.

As described above, by flexibly changing the setting of the options according to a situation of the communication link and the like, at a time of setting up a connection in divided forms between the radio terminal and the wire terminal, for example, it becomes possible to utilize the communication link efficiently.

Next, a procedure for carrying out the shift of the gateway function (handoff by the TCP layer) between the gateway devices in the case where the radio terminal moves between base stations that are accommodated in different gateway devices will be described with reference to FIG. 22.

Figure 22:
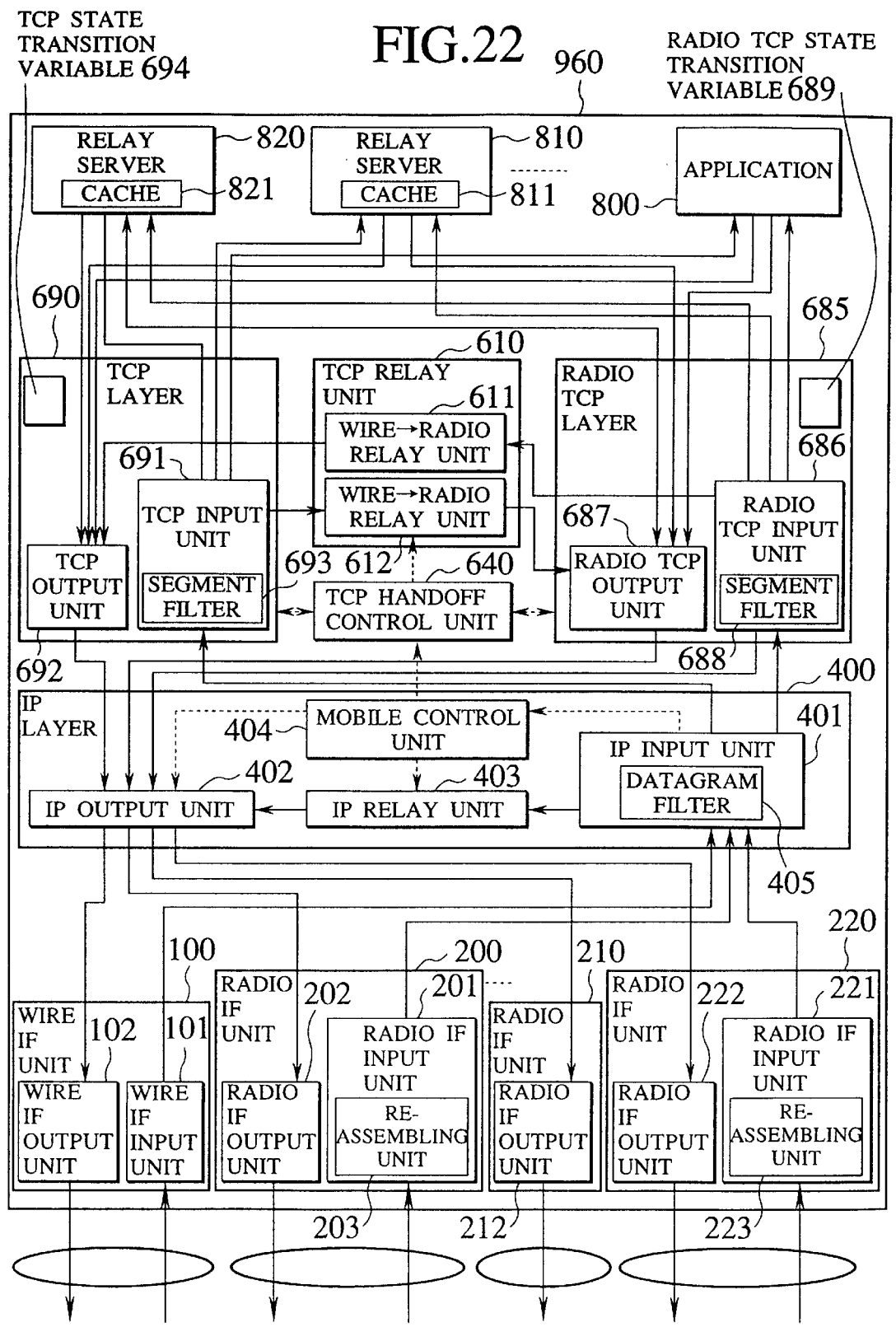
FIG. 22 is a block diagram showing a configuration of a gateway device according to one embodiment of the present invention.

FIG. 22 shows an exemplary configuration of a gateway device according to one embodiment of the present invention, where the elements that are substantially the same as those of FIG. 1 are given the same reference numerals in FIG. 21 and only differences from FIG. 1 will be described.

When the radio terminal moves between base stations that are accommodated in different gateway devices and the shift of the gateway function between these gateway devices (handoff by the TCP layer) is to be carried out, a TCP handoff control unit 640 of the gateway device 960 refers to state transition variables 689 and 694 which respectively indicate current TCP connection states of two TCP connections (one between the gateway device 960 and the radio terminal and another between the gateway device 960 and the wire terminal, for example) that are TCP relayed.

When the state transition variables 689 and 694 of the respective TCP connections both indicate "ESTABLISHED" states, it is detected as a data transfer state where the two TCP relayed TCP connections are currently established, and the series of operations for the handoff by the TCP layer as described above are carried out so that the gateway function can be realized at a new gateway device even after the moving of the radio terminal.

On the other hand, when either one of the state transition variables 689 and 694 of the respective TCP connections is not indicating "ESTABLISHED", the gateway device 960 carries out the processing for disconnecting the respective (non-CLOSED) TCP connections. Of course, there is no need to carry out any operation if both of them are "CLOSED".

By executing the handoff between the gateway devices under such judgement criteria, it becomes possible to eliminate a need for providing the gateway operation procedure in the case of abnormal state transition, so that it is possible to expect the simplification in a configuration of the gateway device.

Next, a procedure for managing TCP connection at the radio terminal when the radio terminal carries out the handoff between different base stations will be described with reference to FIG. 23.

Figure 23:
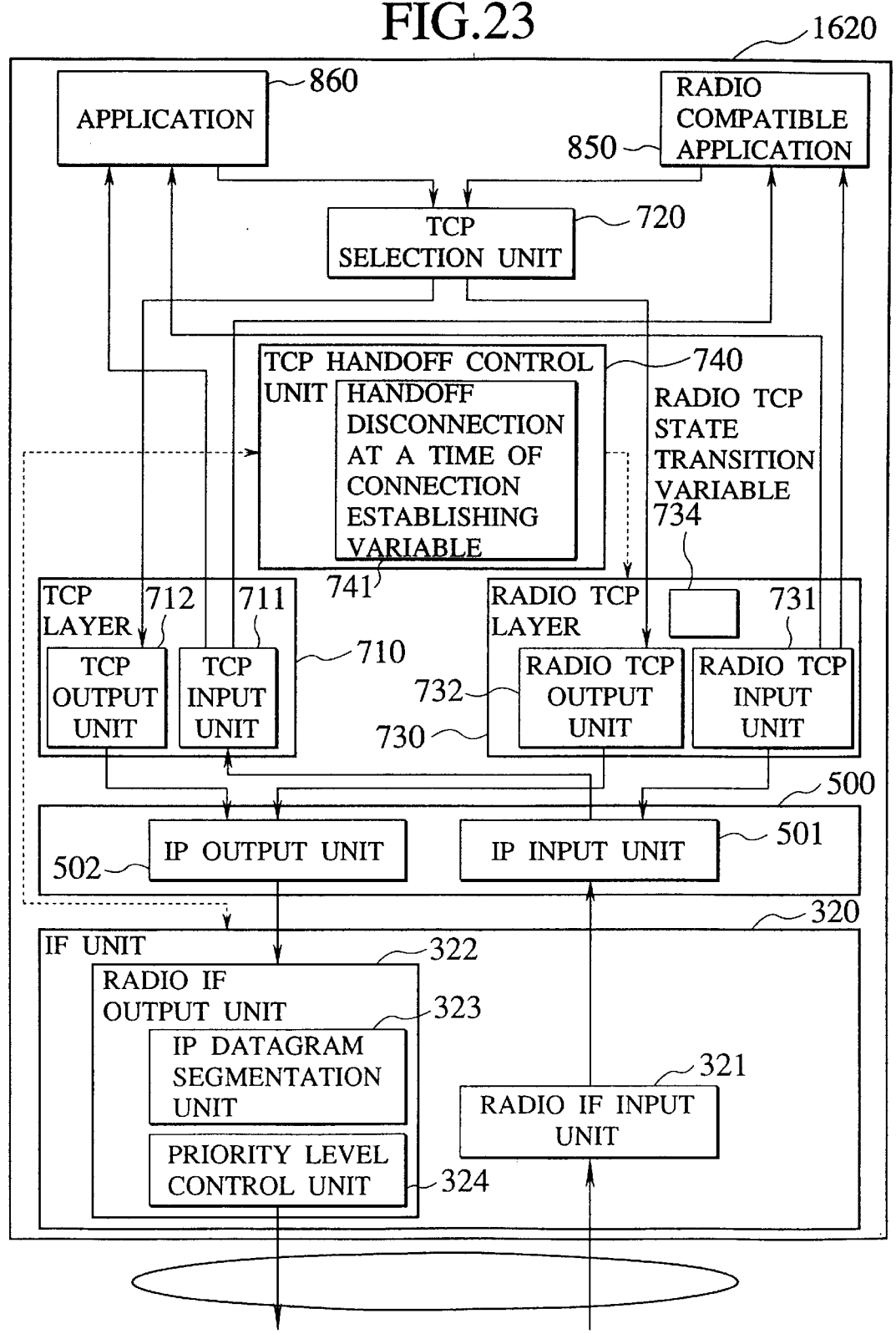
FIG. 23 is a block diagram showing a configuration of a radio terminal device according to one embodiment of the present invention.

FIG. 23 shows an exemplary configuration of the radio terminal according to one embodiment of the present invention, where the elements that are substantially the same as those of FIG. 3 are given the same reference numerals in FIG. 23 and only differences from FIG. 3 will be described.

When a radio transmission path is disconnected in order for the radio terminal 1620 to carry out the handoff between different base stations, a radio TCP state transition variable 734 that indicates a current TCP connection state is referred at a radio TCP layer 730 of the radio terminal 1620. If this variable is one of SYN_SENT, SYN_RCVD, and LISTEN, that is, if it is in a course of establishing a connection, the radio terminal 1620 carries out the operation to disconnect this connection while recording the fact that the disconnection of a connection was made in a handoff disconnection at a time of connection establishing variable 741 in a TCP handoff control unit 740.

Thereafter, when the TCP handoff control unit 740 detects that the handoff of the radio terminal 1620 is completed and a radio transmission path is established, the above described handoff disconnection at a time of connection establishing variable 741 is referred and the operation for re-establishing the TCP connection is started if there is recorded the fact that the disconnection of a connection was made.

By the above, even when a connection is disconnection due to the handoff while the radio terminal 1620 is establishing the TCP connection, it is possible to carry out the re-establishing of the connection after the handoff automatically, so that it is possible to carry out the re-establishing of the connection quickly and it is also possible to eliminate any user operation for the purpose of re-establishing the connection.

Next, a procedure for controlling data flow when a radio transmission path between the radio terminal and the gateway device is disconnected due to handoff, for example, will be described with references to FIG. 2, FIG. 24 and FIG. 25.

Figure 24:
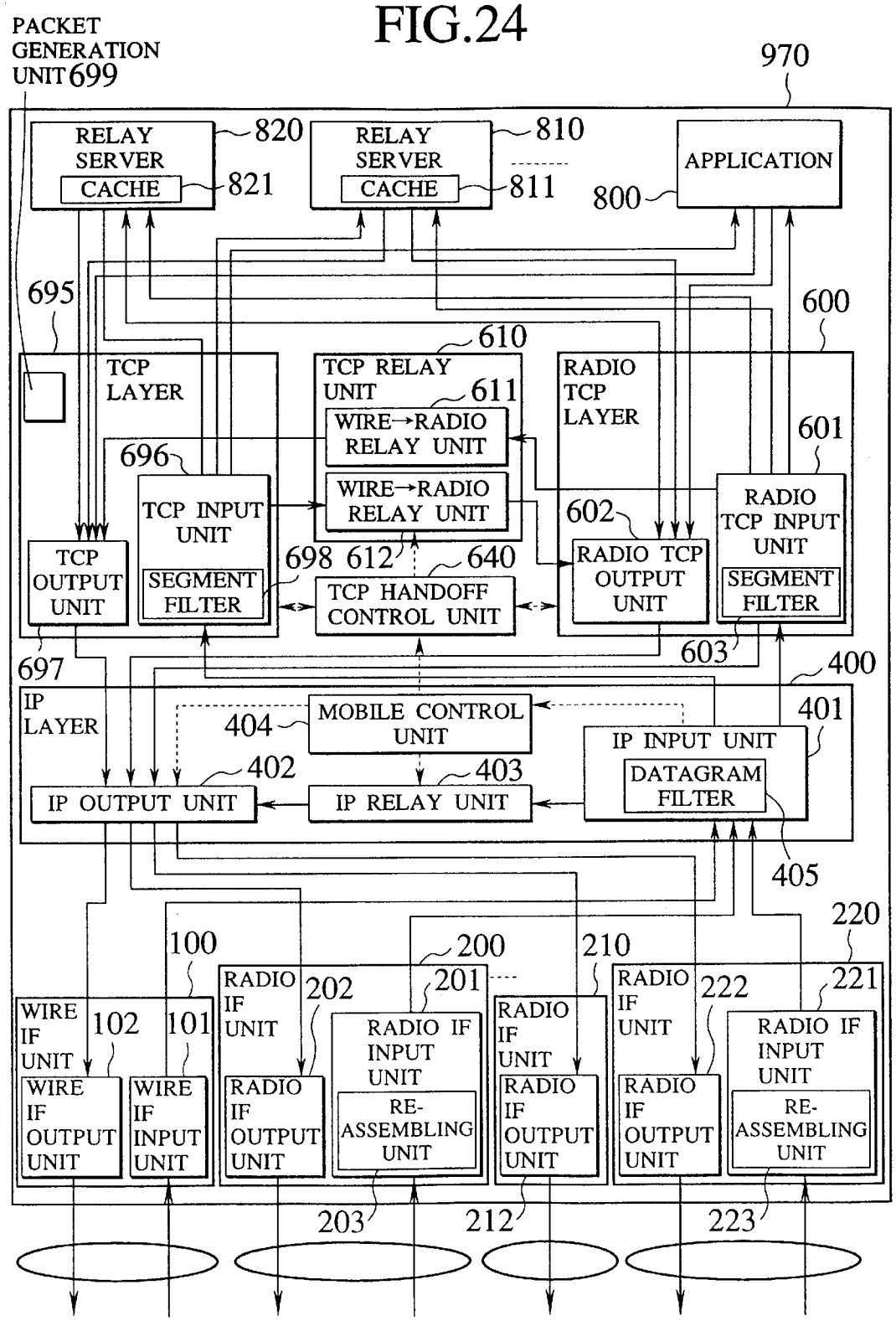
FIG. 24 is a block diagram showing a configuration of a gateway device according to one embodiment of the present invention.
Figure 25:
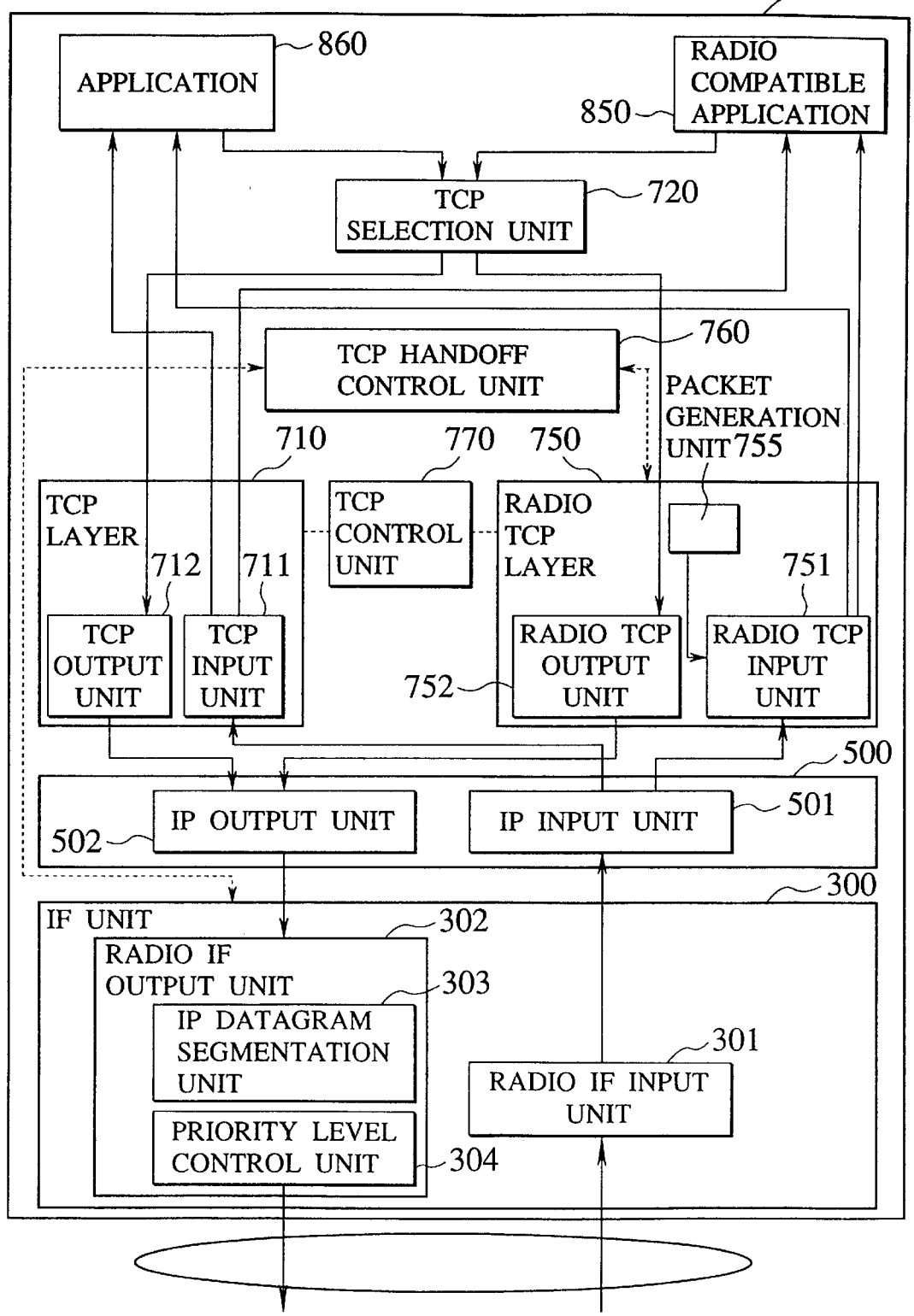
FIG. 25 is a block diagram showing a configuration of a radio terminal device according to one embodiment of the present invention.

FIG. 24 shows an exemplary configuration of the gateway device according to one embodiment of the present invention, where the elements that are substantially the same as those of FIG. 1 are given the same reference numerals in FIG. 24 and only differences from FIG. 1 will be described. Also, FIG. 25 shows an exemplary configuration of the radio terminal according to one embodiment of the present invention, where the elements that are substantially the same as those of FIG. 3 are given the same reference numerals in FIG. 25 and only differences from FIG. 3 will be described. Here, it is assumed that the gateway device 902 in FIG. 2 has a configuration of the gateway device 970 shown in FIG. 24, while the radio terminal 1604 in FIG. 2 has a configuration of the radio terminal 1630 shown in FIG. 25.

When the handoff from the radio service area 1505 covered by the base station 1405 to the radio service area 1506 covered by the base station 1406 is started while the radio terminal 1604 is communicating with the wire terminal 1001 through the gateway device 902 by setting up a connection in divided forms, the TCP handoff control unit 640 in the gateway device 970 commands a packet generation unit 699 in a TCP layer 695 to generate a packet without data in which a window size field is set equal to 0 and outputs this packet to the wire terminal 1001 through a TCP output unit 697. When this packet notifying that the window size is 0 is received, the wire terminal 1001 interprets that there is no vacant receiving buffer in the correspondent radio terminal 1604 and temporarily stops transmission of data destined to the radio terminal 1604 thereafter.

Also, in the case where the correspondent terminal of the radio terminal 1604 is the radio terminal 1603, for example, transmission of data destined to the radio terminal 1604 is temporarily stopped similarly by transmitting a packet with a window size field set equal to 0 to the gateway device 901.

By the above, in a state of being unable to carry out communications although no congestion is occurring in the network, such as a state during the handoff operation for example, it is possible to temporarily stop transmission of data at a TCP layer of the correspondent terminal of the radio terminal while preventing decrease of a congestion window which controls the transmission rate to the radio terminal in this connection, so that it becomes possible to resume the data transmission at a high transmission rate immediately after the handoff is finished.

Also, similarly, a TCP handoff control unit 760 of the radio terminal 1604 that started the handoff operation transmits a signal indicating that the handoff is started to a packet generation unit 755 in a radio TCP layer 750 At this point, the packet generation unit 755 generates a packet without data in which the window size field is 0, the destination address and connection identification port number are set to be an address (IP address) and a port for a connection through which the communications are currently carried out of this radio terminal 1604, and the source address and connection identification port number are set to be an address (IP address) and a port of the wire terminal 1001 that is communicating with this radio terminal 1604. The packet generation unit 755 transmits the packet so generated to a radio TCP input unit 751.

When this packet notifying that the window size is 0 is received, the radio TCP input unit 751 interprets that there is no vacant receiving buffer in the correspondent wire terminal 1001 and temporarily stops transmission of data destined to the wire terminal 1001 thereafter.

The TCP handoff control unit 760 of the radio terminal 1604 transmits a signal indicating that the generation of the above described packet with the window size 0 is to be stopped to the packet generation unit 755, when a signal indicating that the handoff is completed is received from a radio IF unit 300, or when a signal indicating that a packet is received from the wire terminal 1001 that is communicating with this radio terminal 1604 is received from an IP input unit 501 or a radio TCP input unit 751, or else when a signal indicating that the connection with the correspondent wire terminal 1001 is disconnected is received from a TCP control unit 770. The packet generation unit 755 continues to generate this packet at one sec. interval for example and transmit it to the radio TCP input unit 751 until the signal indicating that the generation of the packet with the window size 0 is to be stopped is received.

By the above, in a state of being unable to carry out communications although no congestion is occurring in the network, such as a state during the handoff operation for example, it is possible to temporarily stop transmission of data at a TCP layer of the radio terminal while preventing decrease of a congestion window which controls the transmission rate from the radio terminal side in this connection, so that it becomes possible to resume the data transmission at a high transmission rate immediately after the handoff is finished.

Next, an operation in the case where the radio terminal moves outside the radio service area of the base station accommodated in the gateway device while the radio terminal is communicating with the wire terminal through that gateway device by setting up a connection in divided forms will be described with references to FIG. 2 and FIG. 26.

Figure 26:
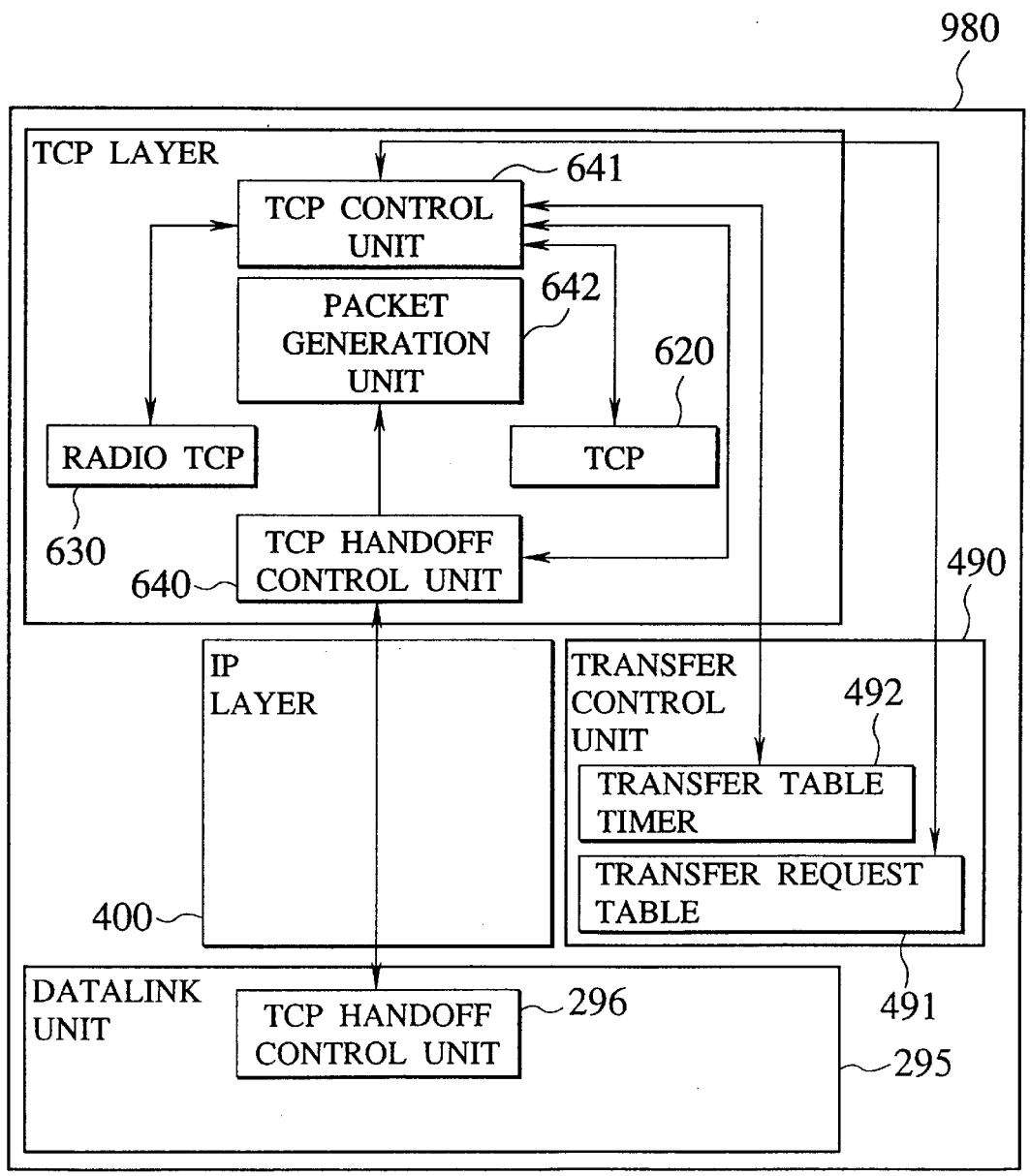
FIG. 26 is a block diagram showing a configuration of a gateway device according to one embodiment of the present invention.

FIG. 26 shows an exemplary configuration of the gateway device according to one embodiment of the present invention, where the elements that are substantially the same as those of FIG. 1 are given the same reference numerals in FIG. 26 and only differences from FIG. 1 will be described. Here, it is assumed that the gateway devices 901–903 in FIG. 2 have a configuration of the gateway device 980 shown in FIG. 26.

Figures 27, 28, 29:
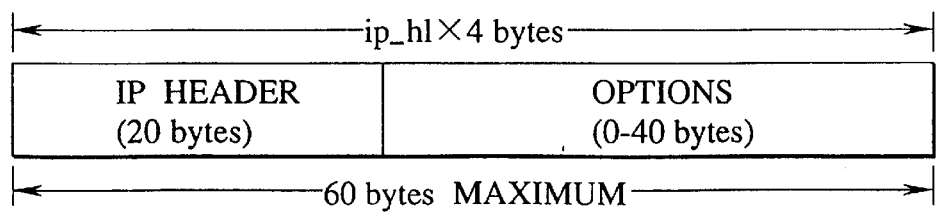
FIG. 27 is a diagram showing a configuration of a transfer request packet to be transmitted by a gateway device according to one embodiment of the present invention.
FIG. 28 is a diagram showing a configuration of a transfer request table to be used by a gateway device according to one embodiment of the present invention.
FIG. 29 is a diagram showing an IP header with options according to the conventional art.

When a TCP handoff control unit 640 of the gateway device 902 receives a signal indicating that a radio transmission path between the radio terminal 1604 and the base station 1405 that are communicating through this gateway device 902 is disconnected, from the base station 1405, for example, the gateway device 902 transmits a packet as shown in FIG. 27 which contains an identifier (such as IP address) of the radio terminal 1604 and an identifier (such as IP address) of this gateway device 902 itself and which requests transfer of packets in case of receiving packets from that radio terminal 1604, to the gateway devices 901 and 903 that are accommodating base stations covering the areas adjacent to the boundary of the radio service areas 1504–1506 of the base stations accommodated in this gateway device 902.

When this packet is received, each of the gateway devices 901 and 903 records an address of the radio terminal 1604 contained in this packet and an address of the gateway device 902 that is requesting the transfer in a transfer request table 491 as shown in FIG. 28.

When the gateway device 901 or 903 at a moved site of the radio terminal 1604 receives a packet from a radio IF unit or a wire IF unit connected to the router 1301 in which the base station is accommodated, the gateway device 901 or 903 refers to the transfer request table 491, and if a source address of the received packet is the address of the radio terminal 1604 registered in the transfer request table 491, the gateway device 901 or 903 transfers this packet to the gateway device 902 that is registered as a transfer target address.

In addition, a timer is set for each entry of the transfer request table 491 at a transfer table timer 492 (a corresponding timer number is described in a timer number field of the transfer request table 491), and when a timer expires after a prescribed period of time elapsed, an entry corresponding to that timer is deleted.

In the case where the function for carrying out the packet transfer as shown in the gateway device 980 of FIG. 26 is not provided at the gateway device 903 of FIG. 2, the function for carrying out the packet transfer may be provided at the base stations 1407 and 1408, and in the case where the function for carrying out the packet transfer is not provided at the gateway device 901 of FIG. 2, the function for carrying out the packet transfer may be provided at the router 1301. In such a case, the gateway device 902 transmits a packet for requesting the transfer as shown in FIG. 27 to the base stations 1407 and 1408 or the router 1301 by the above described procedure.

By the above, even when the radio terminal moves to a service area of a base station accommodated in a different gateway device during communications, it is possible to have packets transferred from the gateway device accommodating that base station or that base station itself, so that the handoff between the gateway devices can be carried out smoothly, without disconnecting the connection.

As described, according to the present invention, it is possible to set up the transport layer connection between a wire terminal and a radio terminal in a form suitable for an application, without changing implementation of the transport layer of a terminal connected to a wire network, and to realize a highly reliable communication network capable of improving the performance of communications utilizing the transport layer connection.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A gateway device for relay connecting a radio network and a wire network, comprising:

a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a control unit for controlling the connection set up unit by determining whether or not to carry out a connection set up by the connection set up unit according to an information content of a packet that contains a transport layer protocol data unit requesting a set up of the transport layer connection between the radio terminal of the radio network and the wire terminal of the wire network.

2. The gateway device of claim 1, wherein the control unit includes a filter unit for determining whether or not to carry out the connection set up by the connection set up unit by receiving the transport layer protocol data unit and referring to at least one of a port identifier indicating a usage of the transport layer connection, a destination address, a source address, and a flow identifier indicating a flow of said packet, which are contained in said packet.

3. The gateway device of claim 1, further comprising:

a transport layer protocol processing unit for carrying out a transport layer protocol processing; and a filter unit for giving the transport layer protocol data unit to the transport layer protocol processing unit at a time of relaying a network layer protocol data unit between the radio network and the wire network, by referring to at least one of a port identifier, a destination address, a source address, and a flow identifier indicating a flow of the network layer protocol data unit, which are contained in the network layer protocol data unit, when a protocol identifier for indicating a protocol type of the transport layer protocol data unit which is contained in the network layer protocol data unit indicates a connection oriented protocol.

4. The gateway device of claim 1, further comprising:

an application layer gateway unit for relaying data in an application layer;

wherein the control unit also determines whether a connection via the application layer gateway unit or a connection via a lower layer than the application layer is to be set up by the connection set up unit, according to the information content of said packet.

5. The gateway device of claim 4, further comprising:

a transport layer protocol processing unit for carrying out a transport layer protocol processing;

an application processing unit for processing applications; and a filter unit for giving the transport layer protocol data unit to the application processing unit via the transport layer protocol processing unit at a time of relaying a network layer protocol data unit between the radio network and the wire network, by referring to at least one of a protocol identifier indicating a protocol type of the transport layer protocol data unit, a port identifier, a destination address, a source address, and a flow identifier indicating a flow of the network layer protocol data unit, which are contained in the network layer protocol data unit, when the control unit determines that the connection via the application layer gateway unit is to be set up by the connection set up unit.

6. The gateway device of claim 5, wherein the application layer gateway unit contains a cache unit for storing at least a part of data to be relayed.

7. The gateway device of claim 6, wherein the connection set up unit sets up only the first connection or the second connection when all the data to be relayed are stored in the cache unit.

8. A gateway device in a communication network in which a plurality of gateway devices connected to respectively different radio networks are inter-connected through a wire network, the gateway device comprising:

a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a control unit for shifting a gateway function to another gateway device if the first connection and the second connection are in established states and disconnecting the first connection and the second connection if one of the first connection and the second connection is not in an established state, when one radio terminal moves from a radio service area covered by a base station of one radio network accommodated in said gateway device to another radio service area covered by another base station of another radio network accommodated in said another gateway device.

9. A gateway control method in a communication network in which a plurality of gateway devices connected to respectively different radio networks are inter-connected through a wire network, where each gateway device has a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network, the method comprising the steps of:

controlling a second gateway device from a first gateway device when one radio terminal moves from a radio service area covered by a first base station of one radio network accommodated in the first gateway device to another radio service area covered by a second base station of another radio network accommodated in the second gateway device, such that the second gateway device starts transmission via the second base station to said one radio terminal of transport layer protocol data units that are not yet transmitted, before the first gateway device receives all acknowledgements for transport layer protocol data units already transmitted to said one radio terminal via the first base station; and shifting a gateway function with respect to said one radio terminal from the first gateway device to the second gateway device.

10. A gateway control method in a communication network in which a plurality of gateway devices connected to respectively different radio networks are inter-connected through a wire network, where each gateway device has a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network, the method comprising the steps of:

controlling a first gateway device when a moving of one radio terminal from a radio service area covered by a first base station of one radio network accommodated in the first gateway device to another radio service area covered by a second base station of another radio network accommodated in a second gateway device is predicted, so as to start transfer to the second gateway device of data which are already transmitted to said one radio terminal by the transport layer protocol but for which acknowledgements from said one radio terminal are not yet received at the first gateway device;

controlling the first gateway device when the moving of said one radio terminal is completed, so as to start transfer of an information regarding the transport layer protocol at the first gateway device to the second gateway device; and shifting a gateway function with respect to said one radio terminal from the first gateway device to the second gateway device.

11. The method of claim 10, further comprising the step of:

receiving a notification regarding a state of prediction of the moving or a completion of the moving of said one radio terminal, at the first gateway device from one of the first base station, the second base station, and said one radio terminal.

12. The method of claim 10, further comprising the steps of:

registering an identifier of the second gateway device at a shift providing device for carrying out allocation of a network layer address in a moved site network or transfer. of network layer protocol data units with respect to said one radio terminal;

transmitting a request for address allocation or transfer from said one radio terminal to the shift providing device, when said one radio terminal detects a move between networks by receiving network identifiers of respective networks broadcast from the first base station and the second base station; and predicting the moving of said one radio terminal or detecting a completion of the moving of said one radio terminal by receiving the identifier of the second gateway device along with a response to said request at said one radio terminal.

13. The method of claim 10, further comprising the step of:

predicting the moving of said one radio terminal or detecting a completion of the moving of said one radio terminal by receiving identifiers of respective gateway devices broadcast by the first base station and the second base station.

14. A gateway device for relay connecting a radio network and a wire network, comprising:

a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a transmission unit for transmitting a transport layer protocol data unit containing a signal for suppressing packet transmission to a correspondent terminal of one radio terminal, when a handoff start signal indicating that said one radio terminal starts operation for handoff from a radio service area covered by a first base station to a radio service area covered by a second base station.

15. A gateway device for relay connecting a radio network and a wire network, comprising:

a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a control unit for controlling transmission of transport layer protocol data units when one radio terminal moves from a radio service area covered by a first base station to another radio service area covered by a second base station, such that transmission via the second base station to said one radio terminal of transport layer protocol data units that are not yet transmitted is started before receiving all acknowledgements for transport layer protocol data units already transmitted to said one radio terminal via the first base station.

16. A router device, comprising:

a connection unit for connecting the router device with a plurality of gateway devices either directly or via network, each gateway device having a connection set up unit for setting up a transport layer connection between radio terminals of the radio network in divided forms of first and second connections in a transport layer protocol for communications with the radio network, or a transport layer connection between a radio terminal of the radio network and a wire terminal of the wire network in divided forms of a first connection in a transport layer protocol for communication with the radio network and a second connection in a transport layer protocol for communications with the wire network; and a route set up unit for making a routing setting such that either network layer protocol data units transmitted by one radio terminal or network layer protocol data unit destined to said one radio terminal will be routed to a specific one of said plurality of gateway devices, at a time of starting service with respect to said one radio terminal.

17. The router device of claim 16, wherein the route set up unit makes the routing setting according to an identifier of one gateway device for routing network layer protocol data units transmitted by said one radio terminal which is specified by exchanges between at least one of said plurality of gateway devices and said one radio terminal.

18. A gateway control method in a communication network having two gateway devices capable of relaying transport layer connection between a first terminal and a second terminal, and carrying out a relay of the transport layer connection by selectively using one of the two gateway devices, the method comprising the steps of:

multicasting transport layer protocol data units transmitted from the first terminal by the transport layer connection, to each of the two gateway devices;

multicasting transport layer protocol data units transmitted from a first gateway device among the two gateway devices that is currently playing a role of relaying the transport layer connection, to the first terminal and a second gateway device among the two gateway devices that is currently playing a role of standby, as a response to the first terminal with respect to transport layer protocol data units received from the first terminal, or to the second terminal and the second gateway device, as a relay to the second terminal;

judging presence or absence of a trouble occurrence in the first gateway device according to at least a state of transport layer protocol data unit reception from the first terminal and the first gateway device, at the second gateway device; and switching roles of the first gateway device and the second gateway device when the judging step judges that a trouble occurred in the first gateway device.

* * * * *